United States Patent [19]
Hibino et al.

[11] Patent Number: 5,631,639
[45] Date of Patent: May 20, 1997

[54] COLLISION ALARM SYSTEM FOR AUTOMOTIVE VEHICLE

[75] Inventors: Katsuhiko Hibino, Toyoake; Noriaki Shirai, Oobu; Takao Nishimura, Nagoya, all of Japan

[73] Assignee: Nippondenso Co., Ltd., Kariya, Japan

[21] Appl. No.: 425,622

[22] Filed: Apr. 20, 1995

[30] Foreign Application Priority Data

Apr. 20, 1994 [JP] Japan .................................. 6-081719
Apr. 22, 1994 [JP] Japan .................................. 6-084627

[51] Int. Cl.$^6$ ............................................. G08G 1/16
[52] U.S. Cl. ................... 340/903; 340/438; 340/439; 340/904; 340/435; 340/436; 364/461; 180/271; 180/167; 180/169
[58] Field of Search ........................ 340/439, 438, 340/903, 904, 435, 436; 364/461, 424.01; 180/271, 167, 169

[56] References Cited

U.S. PATENT DOCUMENTS 4,026,654  5/1977  Beaurain .................................. 340/902
5,357,438 10/1994  Davidian .................................. 364/461

FOREIGN PATENT DOCUMENTS 4201643  7/1992  Japan .
5166097  7/1993  Japan .

*Primary Examiner*—Brent A. Swarthout
*Assistant Examiner*—Daryl C. Pope
*Attorney, Agent, or Firm*—Cushman Darby & Cushman

[57] ABSTRACT

A collision alarm system for an automotive vehicle is provided which includes an object identifying circuit, a stationary object alarm circuit, a moving object alarm circuit, and an alarm inhibiting circuit. The object identifying circuit determines whether an object falling within a given detection zone is a stationary object or a moving object. The stationary object alarm circuit issues an alarm when a distance between the object identified as a stationary object and a system vehicle equipped with this system falls within a given stationary object warning distance. The moving object alarm circuit issues an alarm when a distance between the object identified as a moving object and the system vehicle falls within a given moving object warning distance. The alarm inhibiting circuit inhibits an operation of the moving object alarm circuit for a preselected period of time after the object falling within the given detection zone which has been identified as the stationary object, is identified as the moving object.

25 Claims, 21 Drawing Sheets

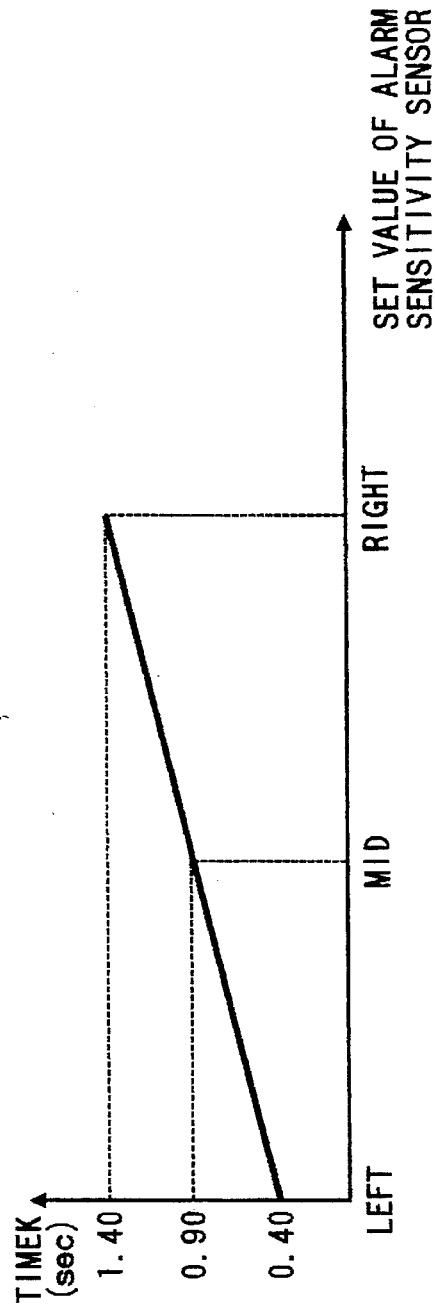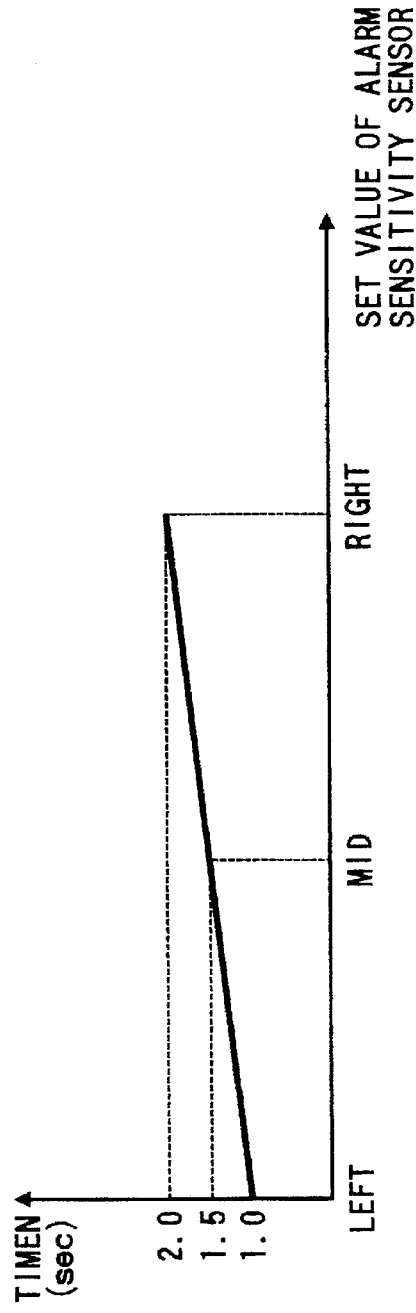

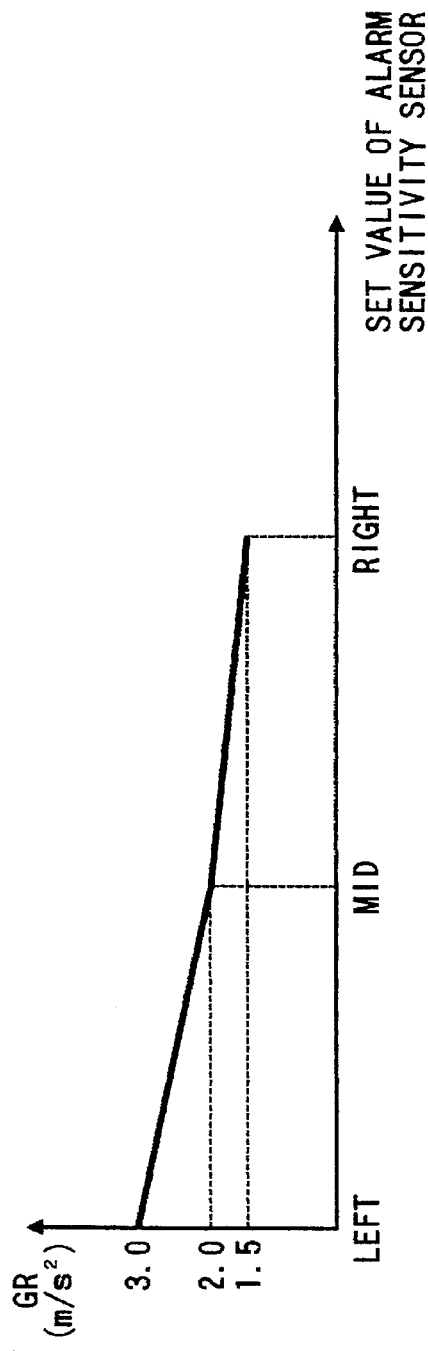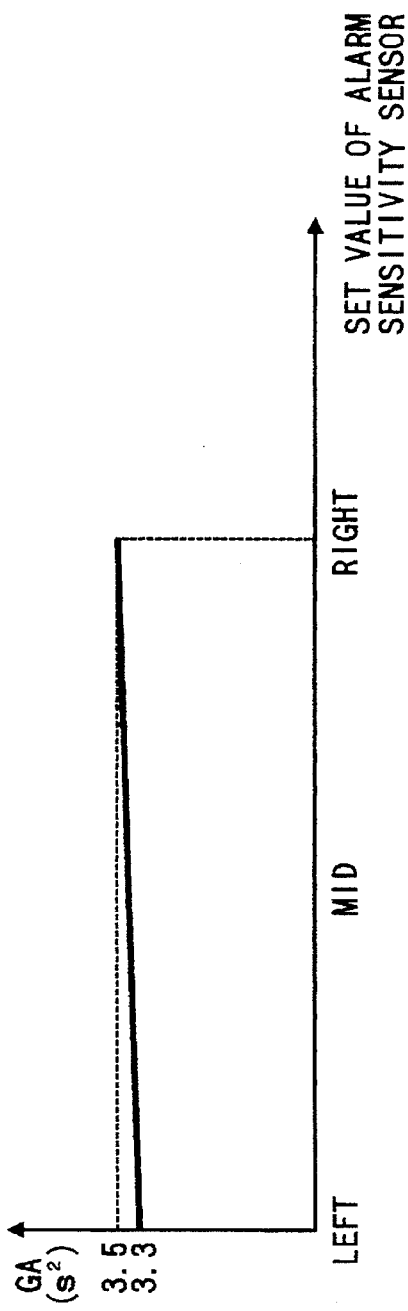

COLLISION ALARM SYSTEM FOR AUTOMOTIVE VEHICLE

BACKGROUND OF THE INVENTION

1. Technical Field

The present invention relates generally to a collision alarm system for an automotive vehicle which rases an alarm when obstacles are tracked within a detection zone defined ahead of the vehicle, and more particularly to an improvement on a collision alarm system which is designed to avoid raising a false alarm.

2. Background Art

Japanese Patent First Publication Nos. 5-166097 and 4-201643 teach a collision alarm system which issues an alarm when a distance between a vehicle and an obstacle ahead thereof falls within a dangerous distance.

The former (No. 5-166097) represents a simple improvement on a conventional collision alarm system which emits a laser beam to track a preceding vehicle and which issues an alarm when an intervehicle distance between the preceding vehicle and a system vehicle equipped with this system falls within a dangerous zone. This system however, does not take stationary obstacles such as side edges of a road into account. Alarms are therefore raised frequently, especially when a side edge of a curved road is detected during cornering, making vehicle passengers feel uncomfortable.

The latter (No. 4-201643) discloses an improved alarm system which is designed to restrict portions of a detection zone on both sides of a road for avoiding a false alarm such as that undesirably raised in the former system.

The above prior art collision alarm systems, however, have suffered from the following drawbacks.

For example, when a vehicle has entered a curved road from a straight road, a guardrail, although tracked initially as a stationary object, becomes identified as a preceding vehicle because it is viewed as an object present at a constant distance away from the vehicle after the vehicle begins turning. Thus, even when the vehicle slightly approaches the guardrail, it recognizes the guardrail as an approaching preceding vehicle that is decelerating, and a false alarm is raised to a vehicle operator.

Additionally, when a large vehicle squeezes between the vehicle and an immediately preceding vehicle, a long side thereof will be tracked sequentially from the front to the rear so that it is identified as an approaching decelerating vehicle, thereby issuing a false alarm.

SUMMARY OF THE INVENTION

It is, therefore, a principal object of the present invention to avoid the disadvantages of the prior art.

It is another object of the present invention to provide an improved collision alarm system for an automotive vehicle which is designed to avoid issuing objectionable false alarms such as those raised in conventional collision alarm systems.

According to one aspect of the present invention, there is provided a collision alarm system for an automotive vehicle which comprises an object determining means for determining whether an object falling within a given detection zone is a stationary object or a moving object and for providing a signal indicative thereof; a stationary object alarm means, responsive to the signal from the object determining means, for issuing an alarm when a distance between the object determined by the object determining means as the stationary object and a system vehicle equipped with this system falls within a given stationary object warning distance; a moving object alarm means, responsive to the signal from the object determining means, for issuing an alarm when a distance between the object determined by the object determining means as the moving object and the system vehicle falls within a given moving object warning distance; and an alarm inhibiting means for inhibiting the moving object alarm means from issuing the alarm for a preselected period of time after the object falling within the given detection zone which has been determined by the object determining means as the stationary object, is determined as the moving object.

In the preferred mode of the invention, the given stationary object warning distance is determined based on a preselected traveling condition of the system vehicle.

The given stationary object warning distance is increased at a first rate in proportion to a speed of the system vehicle within a predetermined lower speed range and at a second rate smaller than the first rate in proportion to the speed of the system vehicle within a predetermined higher speed range.

A boundary between the predetermined lower speed range and the predetermined higher speed range is set to a given speed within a range from 40 to 70 km/h.

The second rate at which the given stationary object warning distance is increased is one-fifth (⅕) of the first rate.

The second rate at which the given stationary object warning distance may alternatively be increased is set to zero.

The given stationary object warning distance within the predetermined lower speed range is set to the sum of a free running distance and a braking distance.

The given stationary object warning distance within the predetermined higher speed range may alternatively be set to the sum of a collision-avoiding distance prodded by a steering operation and a given additional distance.

The preselected period of time during which the moving object alarm means is inhibited from issuing the alarm is shortened according to an increase in speed of the system vehicle, while it is prolonged according to a decrease in speed of the system vehicle.

The given moving object warning distance is determined based on moving conditions of the system vehicle and the object.

According to another aspect of the invention, there is provided a collision alarm system for an automotive vehicle which comprises an object identifying means for monitoring a moving condition of an object present ahead of a system vehicle equipped with this system for identifying the object as a moving object and for providing a signal indicative thereof; a moving object alarm means, responsive to the signal from the object identifying means, for raising an alarm when a distance between the object identified by the object identifying means as the moving object and the system vehicle falls within a given warning distance; and an alarm inhibiting means for inhibiting the moving object alarm means from raising the alarm for a preselected period of time after an object which has been identified by the object identifying means as an object other than the moving object, is identified as the moving object.

In the preferred mode of the invention, the preselected period of time during which the moving object alarm means is inhibited from raising the alarm is prolonged as the distance between the object identified by the object identifying means and the system vehicle is increased.

The object identifying means monitors the moving condition of the object present ahead of the system vehicle to determine whether the monitored object is a moving object or an unidentified object. The alarm inhibiting means inhibits the moving object alarm means from raising the alarm for the preselected period of time after the object which has been identified as the unidentified object is identified as the moving object.

The given warning distance is determined based on moving conditions of the system vehicle and the monitored object.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for explanation and understanding only. In the drawings:

FIG. 13(a) is a graph which shows the relation between a set value of an alarm sensitivity selector and a warning distance parameter TIMEK;

FIG. 13(b) is a graph which shows the relation between a set value of an alarm sensitivity selector and a reaction time parameter TIMEN;

FIG. 14(a) is a graph which shows the relation between a set value of an alarm sensitivity selector and a braking deceleration parameter GR;

FIG. 14(b) is a graph which shows the relation between a set value of an alarm sensitivity selector and a deceleration parameter GA;

DESCRIPTION OF THE PREFERRED EMBODIMENT

Figure 1:
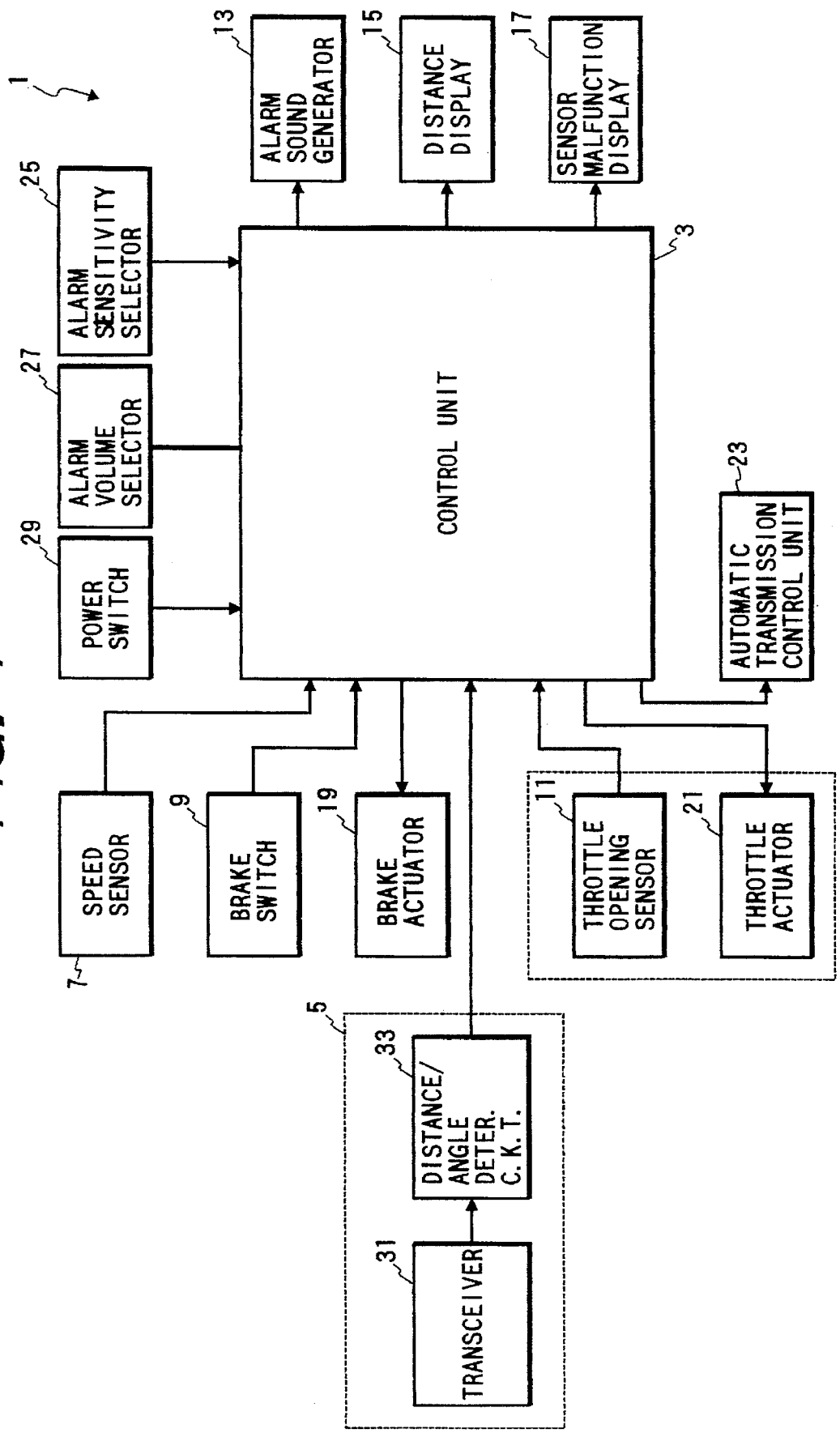
FIG. 1 is a block diagram which shows a collision alarm system for automotive vehicles according to the present invention.

Referring now to the drawings, wherein like reference numbers refer to like parts in several views, particularly to FIGS. 1 and 2, there is shown an automotive collision alarm system 1 according to the present invention which is designed to track an obstacle or object present ahead of an automotive vehicle equipped with this collision alarm system (hereinafter, referred to as a system vehicle) and to raise an alarm to inform a vehicle operator of the possibility of collision when a distance between the object and the system vehicle reaches a warning distance.

The automotive collision alarm system 1 includes a control unit 3 provided with a microcomputer, an input/output interface circuit, driving circuits, and detection circuits which can be of any known arrangements, and explanation thereof in detail will be omitted here.

The control unit 3 receives detection signals outputted from a distance measuring scanner 5, a speed sensor 7, a brake switch 9, and a throttle opening sensor 11, and provides control signals to an alarm sound generator 13, a distance display 15, a sensor malfunction display 17, a brake actuator 19, a throttle actuator 21, and an automatic transmission control unit 23.

The automotive collision alarm system 1 further includes an alarm sensitivity selector 25, an alarm volume selector 27, as will be described later in detail, and a power switch 29. The power switch 29 is designed to be turned on manually or in response to activation of an ignition switch to supply the power to the control unit 3.

The distance measuring scanner 5 includes a transceiver 31 and a distance/angle determining circuit 33. The transceiver 31 transmits a laser beam forward of the system vehicle to scan a range defined by a given angle, and receives a reflected beam from an object or target present ahead of the system vehicle. The distance/angle determining circuit 33 determines a relative speed between the system vehicle and the target, a distance to the target, and coordinates of the target based on the length of time between the transmission of the laser beam and reception thereof. This type of radar unit is well known in the art, and further explanation thereof in detail will be omitted here. The distance measuring scanner 5 may alternatively be provided with a so-called stationary beam type of distance measuring device designed to measure only a relative speed and distance to a target, or with a device using a microwave or a supersonic wave.

The control unit 3 is responsive to a signal from the distance measuring scanner 5 and determines if an object present ahead of the system vehicle falls within a given distance set based on traveling conditions of the system vehicle and the object. When the object falls within the given distance, the control unit 3 concludes that there is a high possibility of collision, and raises an alarm to the vehicle operator. In addition, the control unit 3 may perform cruise control that controls the brake actuator 19, the throttle actuator 21, and/or the automatic transmission control unit 23 to regulate the speed of the system vehicle according to the status of the object.

Figure 2:
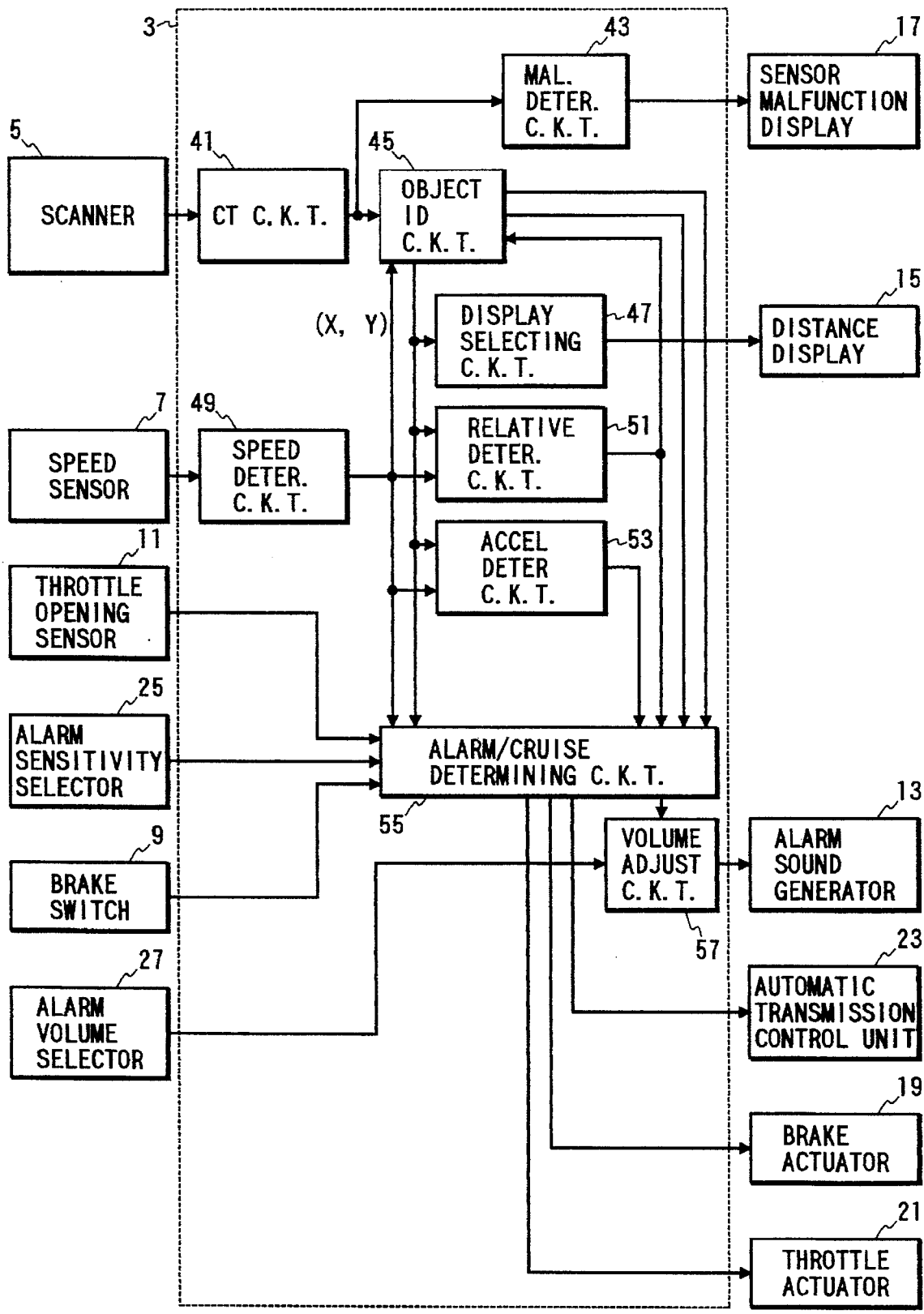
FIG. 2 is a block diagram which shows circuit arrangements of a control unit of a collision alarm system.

The control unit 3, as shown in FIG. 2, includes a coordinate transformation circuit 41, a sensor malfunction determining circuit 43, an object identifying circuit 45, a distance display object selecting circuit 47, a speed determining circuit 49, a relative speed determining circuit 51, an object acceleration determining circuit 53, an alarm/cruise determining circuit 55, and a volume adjusting circuit 57.

The coordinate transformation circuit 41 receives from the distance measuring scanner 5 data indicative of a distance and an angle to a target present ahead of the system vehicle and transfers it on a X-Y rectangular coordinate plane whose origin is defined on the system vehicle. The sensor malfunction determining circuit determines whether values transferred on the X-Y coordinate plane represent normal values or not, and provides a signal indicative thereof to the sensor malfunction display 17.

The object identifying circuit 45 determines a type of the target, a width of the target, and coordinates of a central position of the target based on a speed of the system vehicle and a relative speed between the system vehicle and the target using the X-Y coordinate plane. The determination of the type of the target is made to determine whether the target is a moving object or an object which cannot be identified as a moving object. When a plurality of targets are detected, the distance display object selecting circuit 47 selects ones which will interfere with traveling of the system vehicle and directs the distance display 15 to display distances to the selected targets.

The speed determining circuit 49 is responsive to a signal from the speed sensor 7 and determines a speed of the system vehicle. The relative speed determining circuit 51 determines a relative speed between the system vehicle and the target based on the speed of the system vehicle determined by the speed determining circuit 49 and the central position of the target determined by the object identifying circuit 45. The object acceleration determining circuit 53 determines an acceleration of the target (a relative acceleration) on the basis of the position of the system vehicle using the speed of the system vehicle and the central position of the target.

The alarm/cruise determining circuit 55 determines in an alarm mode whether an alarm is to be raised or not or determines in a cruise mode the contents of speed control based on the speed of the system vehicle, the relative speed between the system vehicle and the target, the relative acceleration of the target, the central position of the target, the width of the target, the type of the target, an output from the brake switch 9, an opening degree of the throttle sensed by the throttle opening sensor 11, and a value of sensitivity set by the alarm sensitivity selector 25. When it has been concluded that an alarm needs to be raised, the alarm/cruise determining circuit 55 provides an alarm generating signal to the alarm sound generator 13 through the volume adjusting circuit 57. The volume adjusting circuit 57 adjusts the volume of output from the alarm sound generator 13 based on a set value of the alarm volume selector 27. Alternatively, the alarm/cruise determining circuit 55, in the cruise mode, provides control signals to the automatic transmission control unit 23, the brake actuator 19, and the throttle actuator 21 to perform given cruise control.

Figure 3:
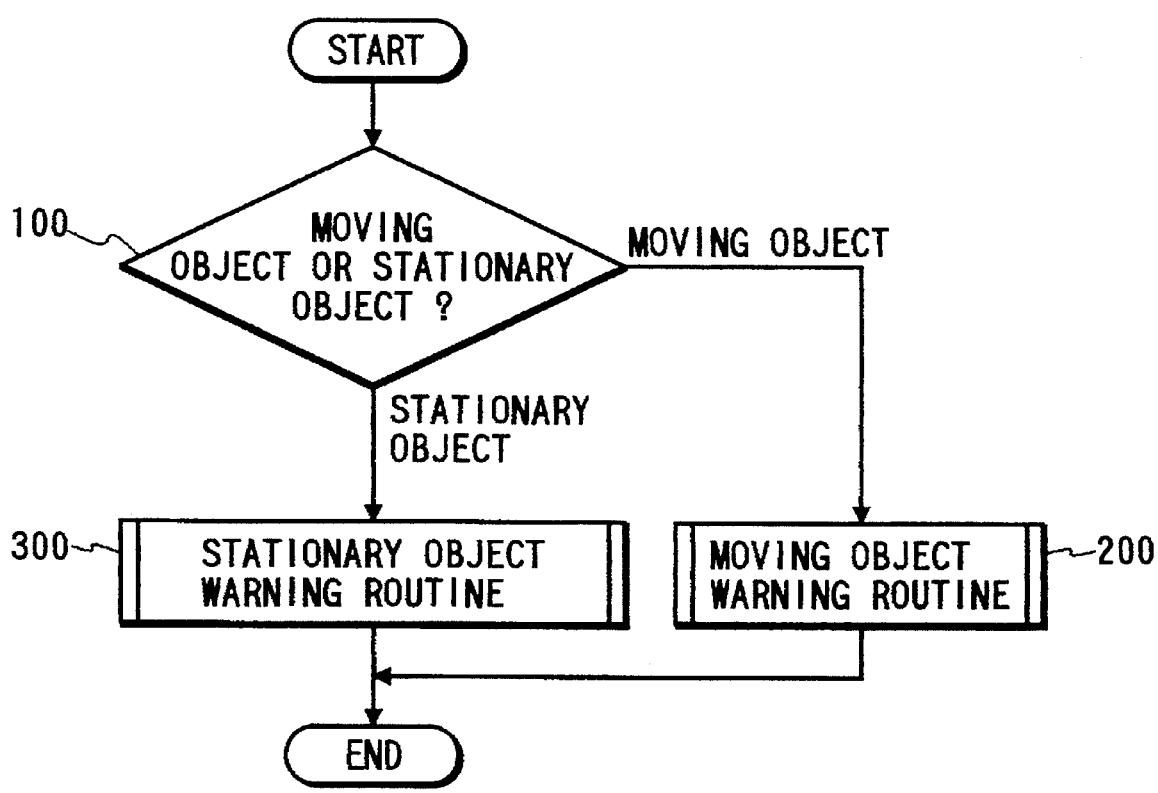
FIG. 3 is a flowchart which shows an alarm operation of a collision alarm system.

FIG. 3 shows a flowchart of a program or sequence of logical steps performed by the alarm/cruise determining circuit 55 in the alarm mode. The program starts in response to a turning-on operation of the power switch 29 and is repeated at a given cycle.

After entering the program, the routine proceeds to step 100 wherein it is determined whether an obstacle tracked by the distance measuring scanner 5 is a moving object or a stationary object based on a signal from the distance measuring scanner 5. For example, when the system vehicle is traveling, although the position of the obstacle remains unchanged, it may be considered as a moving object. Similarly, when the obstacle moves away from the system vehicle, it may be considered as a moving object. Alternatively, when the obstacle approaching the system vehicle is traveling at the same absolute speed as that of the system vehicle, it may be considered as a stationary object. In other cases, for example, when a period of time after the obstacle is tracked is not enough to identify it, it is considered as an unidentified object.

If the obstacle tracked is identified as a moving object, or preceding vehicle, in step 100, then the routine proceeds to step 200 wherein a moving object warning routine is performed. Alternatively, if the obstacle is considered as a stationary object, then the routine proceeds to step 300. If the obstacle is considered as an unidentified object, then the routine proceeds passing through both steps 200 and 300.

Figure 4:
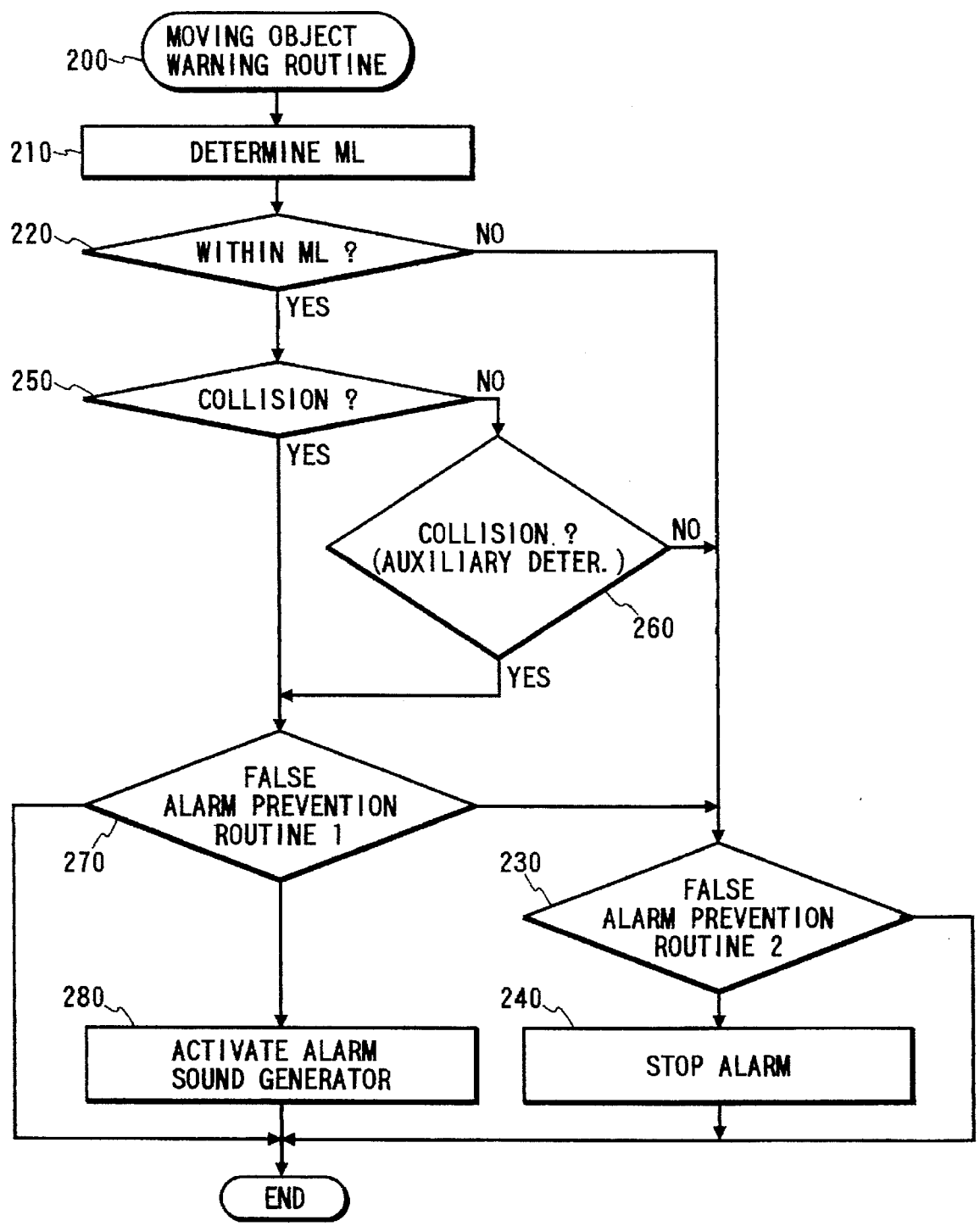
FIG. 4 is a flowchart which shows a moving object alarm operation of a collision alarm system.

FIG. 4 shows the moving object warning routine executed in step 200 of FIG. 3.

First, in step 210, a moving object warning distance ML used for determining whether an alarm should be raised or not is derived according to the following relation.

$$ML = VR \cdot TIMEK - VRR \cdot TIMEN + VRR^2/(2 \cdot GR) - \alpha G \cdot GA \tag{1}$$

where VR is the speed of the system vehicle (m/s), TIMEK is a warning distance parameter (s) indicating a distance to a moving object (i.e., a preceding vehicle) which the operator of the system vehicle feels is dangerous and which is expressed by a time parameter, VRR is a relative speed (m/s) of the preceding vehicle relative to the system vehicle which is expressed as a negative value when the preceding vehicle is approaching the system vehicle, TIMEN is a reaction time parameter (s) indicative of a reaction time of the vehicle operator required for initiating a braking operation, GR is a braking deceleration parameter (m/s$^2$) indicative of the degree of braking force exerted by the vehicle operator, αG is an acceleration of the preceding vehicle (m/s$^2$) (a relative acceleration of the preceding vehicle on the basis of the system vehicle), and GA is a deceleration parameter (s$^2$) of the preceding vehicle indicative of the degree of braking force which is exerted by an operator of the preceding vehicle and which is sensed by the operator of the system vehicle.

The speed of the system vehicle VR is derived directly from the speed sensor 7. The relative speed VRR and the preceding vehicle acceleration αG are determined by a variation in relative position obtained by the distance measuring scanner 5.

The warning distance parameter TIMEK, the reaction time parameter TIMEN, the braking deceleration parameter GR, and the preceding vehicle deceleration parameter GA are calculated based on data derived by a measuring device mounted on the system vehicle. This measuring device can be of any device known in the art.

It will be thus appreciated that a value of VR·TIMEK represents an intervehicle distance the vehicle operator feels dangerous, a value of VRR·TIMEN represents a free running distance, a value of VRR$^2$/(2·GR) represents a stopping distance, and a value of αG·GA represents an acceleration variation distance. These parameters may be derived in the following manner.

The warning distance parameter TIMEK is derived by dividing intervehicle distances which some vehicle operators have practically felt dangerous by the then instantaneous speeds of the system vehicle, respectively and averaging them. FIG. 13(a) shows an example where the averaged value is 0.90 (sec.) defined as the middle value of TIMEK. A value of TIMEK can be changed by the alarm sensitivity selector 25 over a range from 0.40 to 1.40 (sec.) which is set based on a standard deviation of the measured values.

The reaction time parameter TIMEN is determined based on a human reaction time which is well known in the art, but may alternatively be determined based on an average value or a standard deviation derived by measuring reaction times of some vehicle operators. FIG. 13(b) shows an example where 1.5 that is the average of 1 and 2 is defined as a middle value. This is due to the fact that a human reaction time is generally known to lie within a range from 1 to 2 sec. A value of TIMEN can be changed by the alarm sensitivity selector 25 over a range from 1.0 to 2.0 sec.

The braking deceleration parameter GR is determined based on observations of some vehicle operators in a similar manner to that for determining the warning distance parameter TIMEK. FIG. 14(a) shows the braking deceleration parameter GR thus determined. The braking deceleration parameter GR has 2.0 (m/s$^2$) set as a middle value and can be changed by the alarm sensitivity selector 25 over a range from 1.5 to 3.0 (m/s$^2$).

The preceding vehicle deceleration parameter GA is determined by finding a safe distance allowing the system vehicle to avoid a collision with the preceding vehicle when the system vehicle brakes at the same deceleration as that of the preceding vehicle after a reaction time of the vehicle operator of the system vehicle following initiation of a braking operation of the preceding vehicle, and dividing it by the deceleration of the preceding vehicle. Since a calculated value indicative of the deceleration of the preceding vehicle is blurred by a filter, it is doubled for correction. FIG. 14(b) shows the preceding vehicle deceleration parameter GA thus determined which has 3.4 (s$^2$) defined as a middle value and can be changed by the alarm sensitivity selector 25 over a range from 3.3 to 3.5 (s$^2$).

The relations, as shown in FIGS. 13(a), 13(b), 14(a), and 14(b), of TIMEK, TIMEN, GR, and GA to a parameter selected by the alarm sensitivity selector 25 are stored as mapped data in a memory of the control unit 3.

Figure 9:
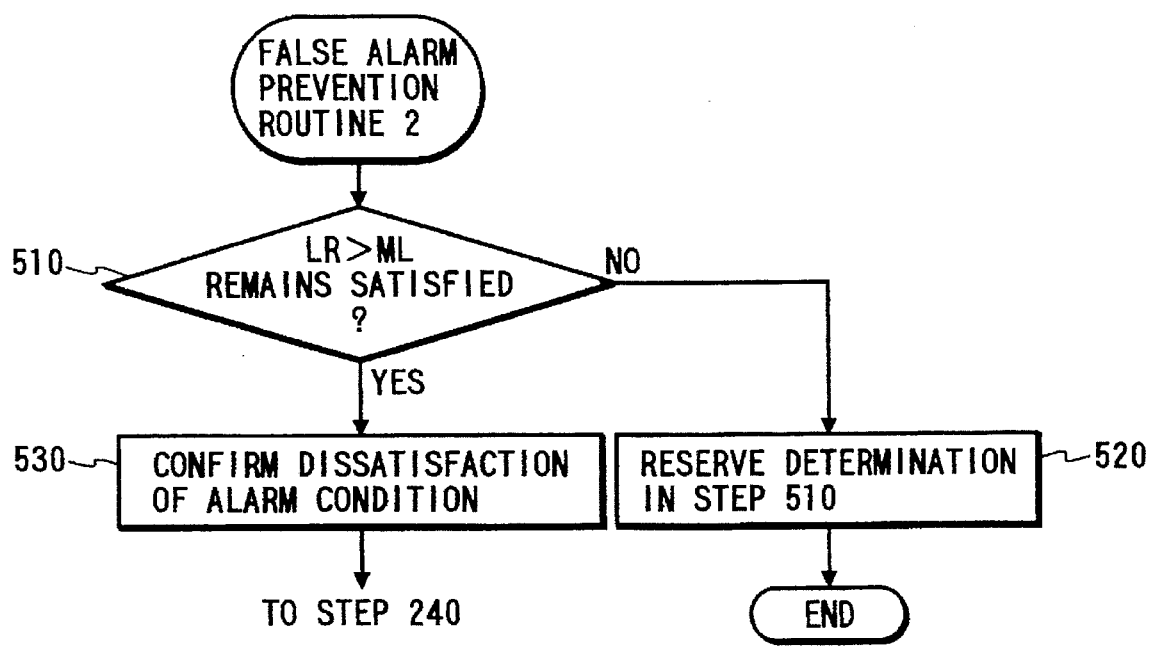
FIG. 9 is a flowchart which shows a false alarm prevention routine 2 executed by a collision alarm system.

Returning back to FIG. 4, after the moving object warning distance ML is determined in step 210 in the above manner, the routine proceeds to step 220 wherein it is determined whether the system vehicle falls within the moving object waning distance ML or not by comparing an actual intervehicle distance LR measured by the distance measuring scanner 5 with the moving object warning distance ML. If the actual intervehicle distance LR is greater than the moving object warning distance ML, then the routine proceeds to step 230 wherein a false alarm prevention routine 2, as shown in FIG. 9, is carried out which provides a hysteresis for preventing an alarm condition from not being satisfied only by instantaneous detection.

After entering step 230, the routine proceeds to step 510 wherein it is determined whether a condition of LR>ML remains satisfied for a given period of time or not. If a NO answer is obtained, then the routine proceeds to step 520 wherein the determination in step 510 is reserved. Alternatively, if a YES answer is obtained in step 510, then the routine proceeds to step 530 wherein it is concluded that the alarm condition is not satisfied. After step 530, the routine proceeds to step 240 in FIG. 4 wherein an alarm is stopped when the alarm sound generator 13 is activated, while when no alarm is raised, the alarm sound generator 13 is maintained off.

Figure 10:
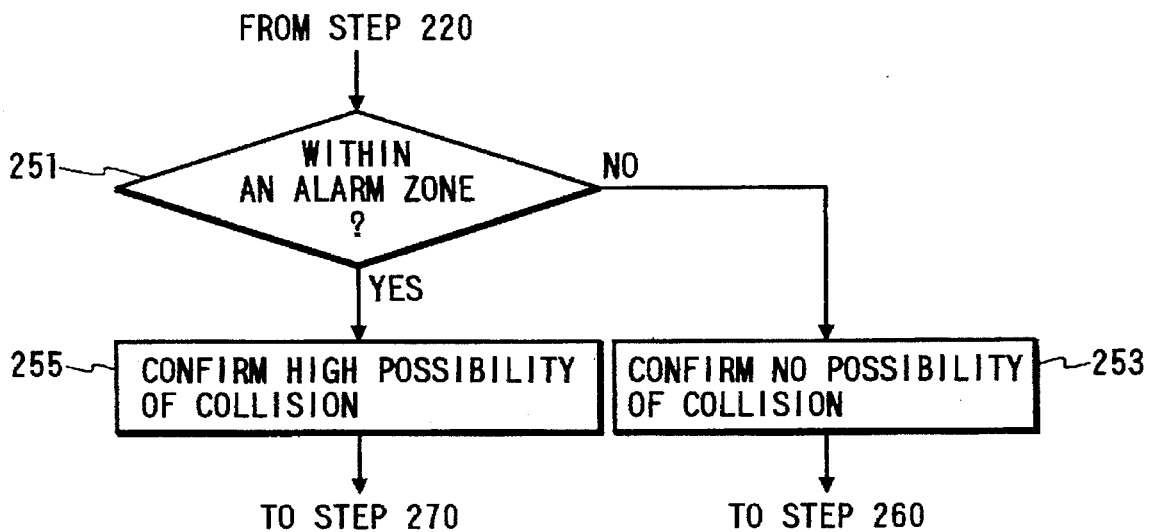
FIG. 10 is a flowchart for a collision determination.

If a NO answer is obtained, meaning that the actual intervehicle distance LR is less than or equal to the moving object warning distance ML, then the routine proceeds to step 250 wherein it is concluded that the system vehicle is in close proximity to the preceding vehicle. FIG. 10 shows a routine performed in step 250 which provides hysteresis for preventing the alarm condition from being satisfied only by instantaneous detection.

In step 251, it Is determined whether at least part of the width of the moving object falls within an alarm zone for a predetermined period of time or not. The alarm zone is a range defined forward of the system vehicle within which there is a high possibility of collision with the preceding vehicle and which is determined based on a traveling direction, a speed, and an acceleration of the system vehicle, and a speed and an acceleration of the preceding vehicle.

If a NO answer Is obtained concluding that the system vehicle does not fall within the alarm zone for the predetermined period of time, then the routine proceeds to step 253 wherein it is concluded that there is almost no possibility of collision with the preceding vehicle. Alternatively, if a YES answer is obtained in step 251, then the routine proceeds to step 255 wherein It is concluded that there is a high possibility of collision with the preceding vehicle.

Figure 11:
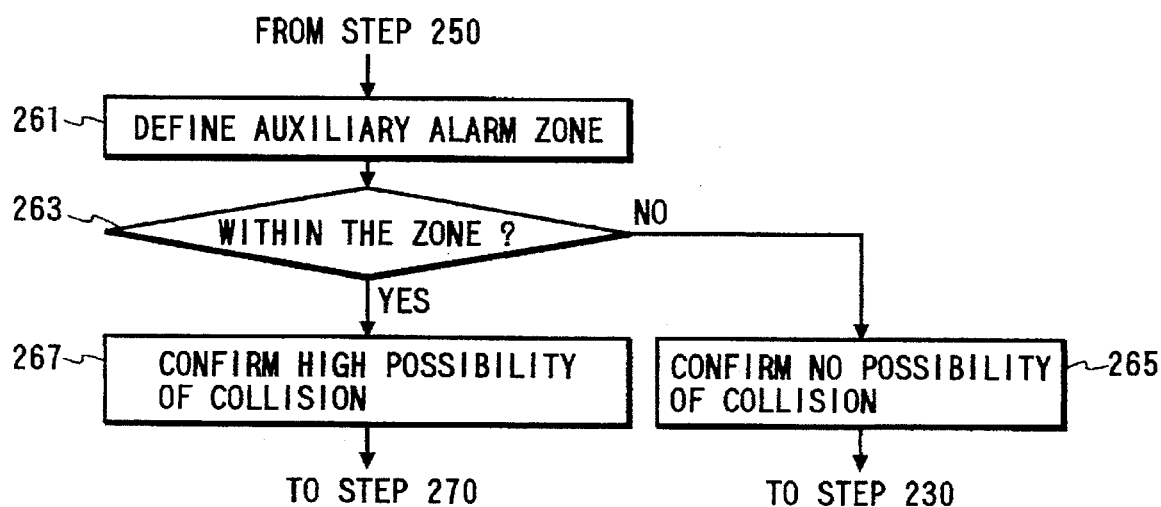
FIG. 11 is a flowchart for an auxiliary collision determination.

After step 253, the routine proceeds to step 260 in FIG. 4 wherein an auxiliary collision determination is made which is shown in FIG. 11.

In step 261, an auxiliary alarm zone is defined immediately in front of the system vehicle according to a speed of the system vehicle. The auxiliary alarm zone is provided by simple calculation taking into account the dangers of another vehicle nipping immediately in front of the system vehicle.

In step 263, it is determined whether at least part of an object falls within the auxiliary alarm zone for a given period of time or not. If a NO answer is obtained, then the routine proceeds to step 265 wherein it is concluded that there is almost no possibility of collision with the object tracked. Alternatively, if a YES answer is obtained, then the routine proceeds to step 267 wherein it is concluded that there is a high possibility of collision with the tracked object.

Figure 6:
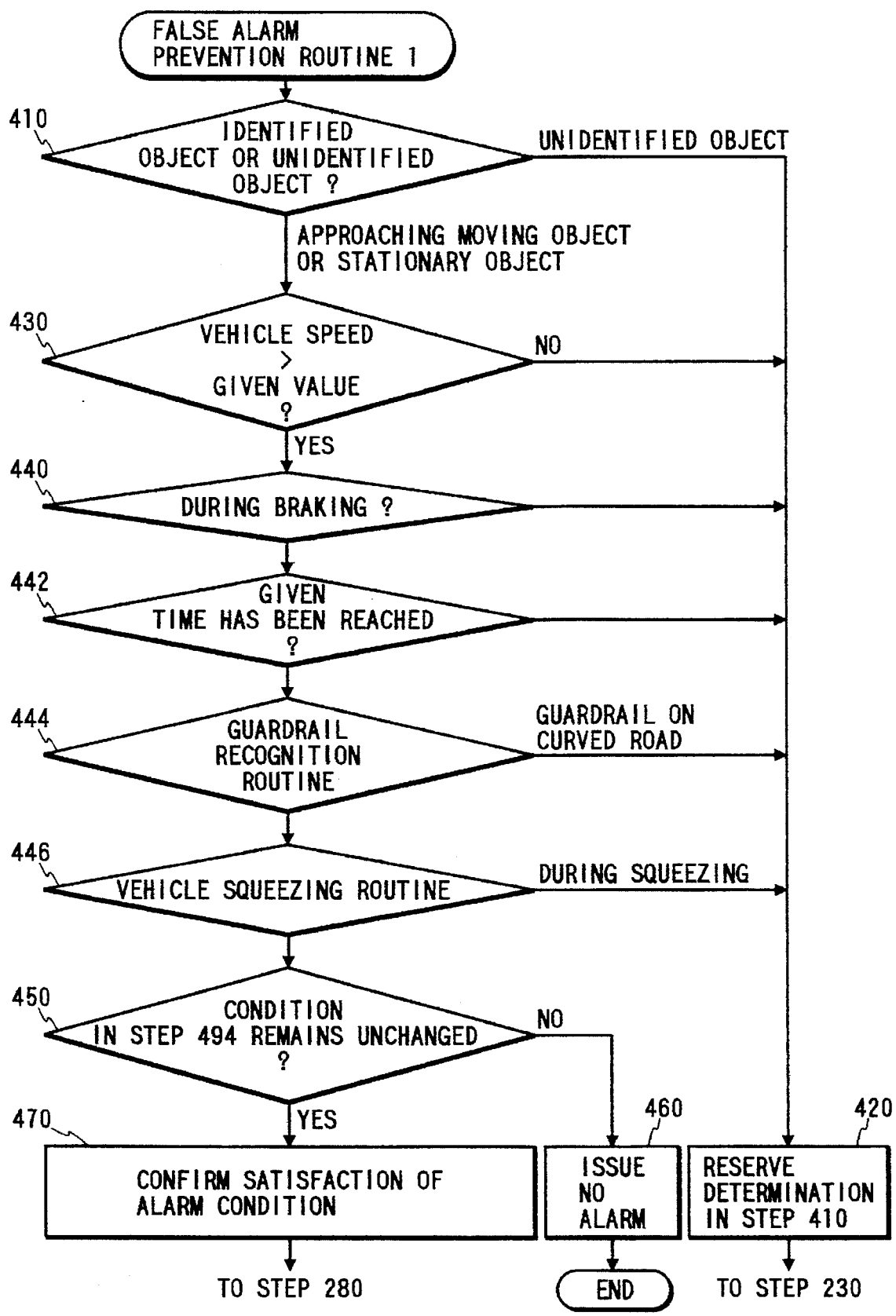
FIG. 6 is a flowchart which shows a false alarm prevention routine 1 executed by a collision alarm system.

If the determination that there is almost no possibility of collision with an object ahead of the system vehicle has been made both in steps 250 and 260, then the routine proceeds to step 230. Alternatively, if the determination that there is a high possibility of collision with an object ahead of the system vehicle has been made either in step 250 or 260, then the routine proceeds to step 270 wherein a false alarm prevention routine 1 is carried out which is shown in the flowchart of FIG. 6.

In step 410, a condition of the object tracked is determined. If the object is a moving object approaching the system vehicle or a stationary object, then the routine proceeds to step 430. Alternatively, when the object is in another condition, for example, it is moving away from the system vehicle, then the routine proceeds to step 420 wherein the determination in step 410 is reserved or deferred until a subsequent control cycle, after which the routine goes to step 230.

If the object tracked is approaching the system vehicle or in a stationary state (since step 410 is carried out in the moving object identifying routine in step 200, only the approaching object is, in fact, detected in step 410), then the routine proceeds to step 430 wherein it is determined whether a speed of the system vehicle is greater than a given warning threshold speed or not. Usually, when the system vehicle is traveling on a narrow city road or in a parking lot, many moving and stationary obstacles are detected so that an alarm is raised frequently. However, in this case, the possibility of collision is very low because the system vehicle is traveling at low speeds. Accordingly, in order to avoid such an unnecessary alarm, the comparison of the speed of the system vehicle with the warning threshold speed that is a safe stopping speed is made in step 430. If the speed of the system vehicle is lower than the warning threshold speed, then the routine proceeds to step 420.

Alternatively, if a YES answer is obtained in step 430, then the routine proceeds to step 440 wherein it is determined whether the system vehicle is now braking or not based on a signal from the brake switch 9. If the system vehicle is braking, then the routine proceeds to step 420 wherein no alarm is raised to the vehicle operator. This is because the vehicle operator depressing a brake pedal may be considered to give sufficient attention to forward traffic conditions.

Figure 7:
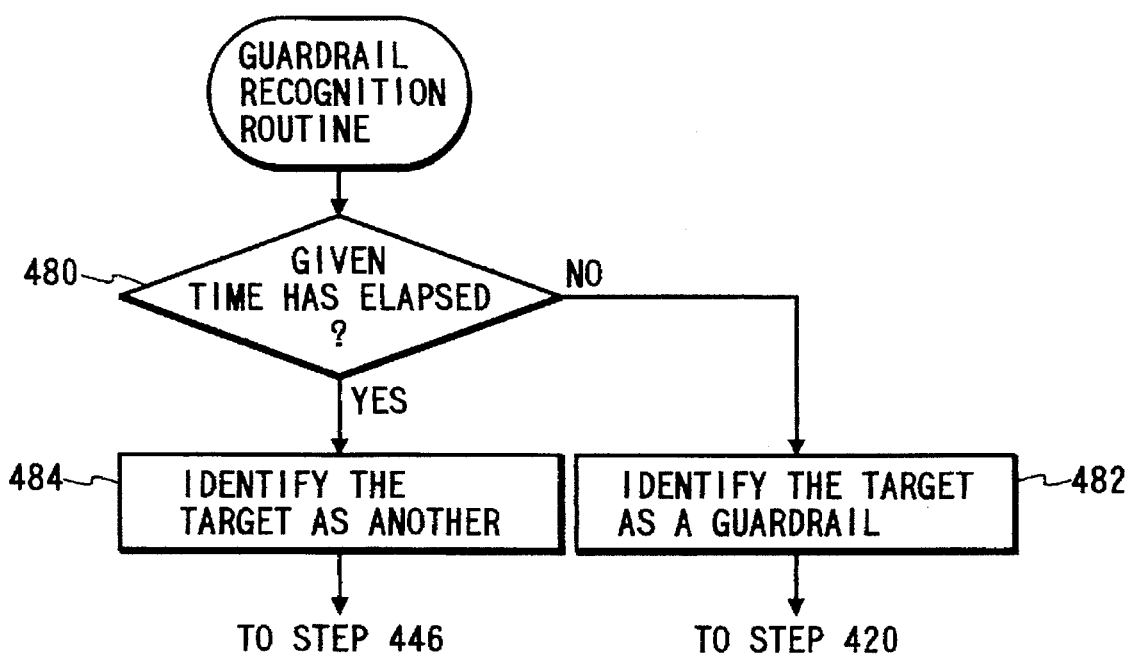
FIG. 7 is a flowchart for avoiding a false alarm caused by detection of a guardrail on a curved road.

Alternatively, if the system vehicle is not in a braking operation, then the routine proceeds to step 442 wherein it is determined whether or not a given period of time, for example, five (5) seconds has elapsed since an alarm was raised previously. The reason for providing this time interval is that continuous alarms cause discomfort to vehicle occupants. Accordingly, if five seconds has not yet expired, the routine proceeds to step 420. Alternatively, if five seconds has expired, then the routine proceeds to step 444 where a guardrail recognition routine, as shown in FIG. 7, is performed.

Figure 8:
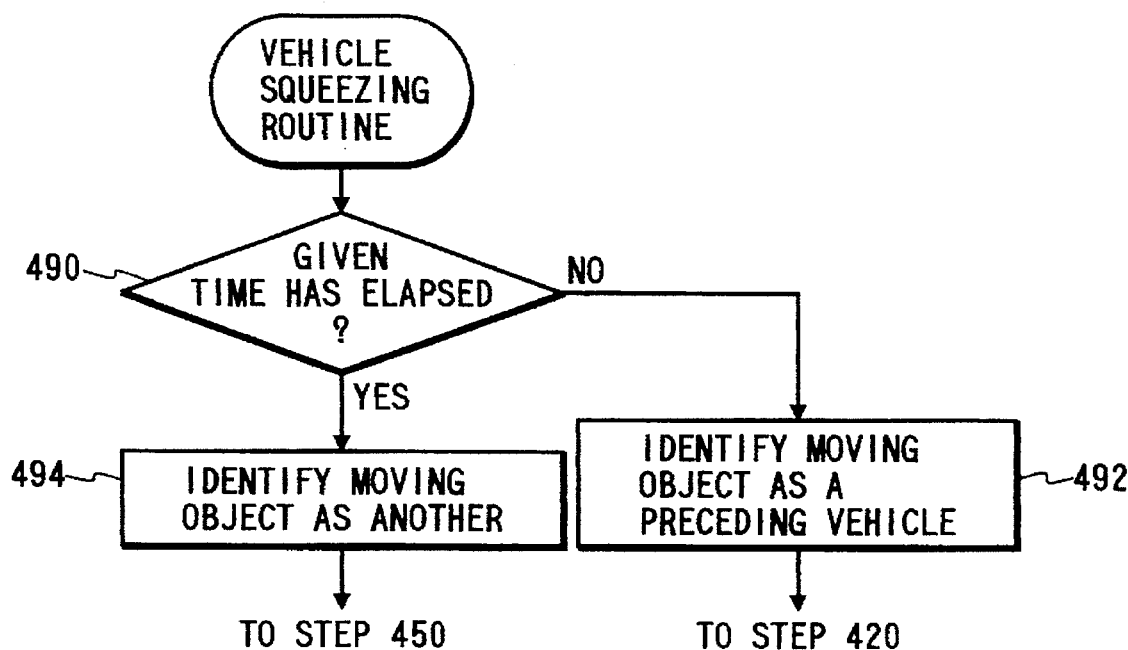
FIG. 8 is a flowchart of an alarm operation when a vehicle squeezes between a system vehicle and a preceding vehicle.

In step 480, it is determined whether or not a preselected period of time (e.g., three seconds) has elapsed after a target tracked is changed from a stationary object to a moving object. This determination is, in practice, made by counting a value of a timer initiated upon changing of the target to the moving object. If the preselected period of time has not yet elapsed, then the routine proceeds to step 482 wherein it is concluded that the target tracked is a side edge of a road such as a guardrail, and then goes to step 420. Alternatively, if the preselected period of time has elapsed, then the routine proceeds to step 484 wherein it is concluded that the target tracked is an obstacle other than a guardrail, and then goes to step 446 shown in FIG. 6 wherein a vehicle squeezing routine, as shown in FIG. 8, is performed.

In step 490, it is determined whether or not a preselected period of time has elapsed after a target tracked by the system vehicle is changed from an unidentified object to a moving object. This determination is, in practice, made by counting a value of a timer initiated upon changing of the target to the moving object If the preselected period of time has not yet elapsed, then the routine proceeds to step 492 wherein it is concluded that the moving object is a preceding vehicle which is now nipping in front of the system vehicle, and then goes to step 420. Alternatively, if the preselected period of time has elapsed, then the routine proceeds to step 494 wherein it is concluded that the moving object is an obstacle other than a preceding vehicle nipping in front of the system vehicle, and then goes to step 450 shown in FIG. 6.

Figure 16:
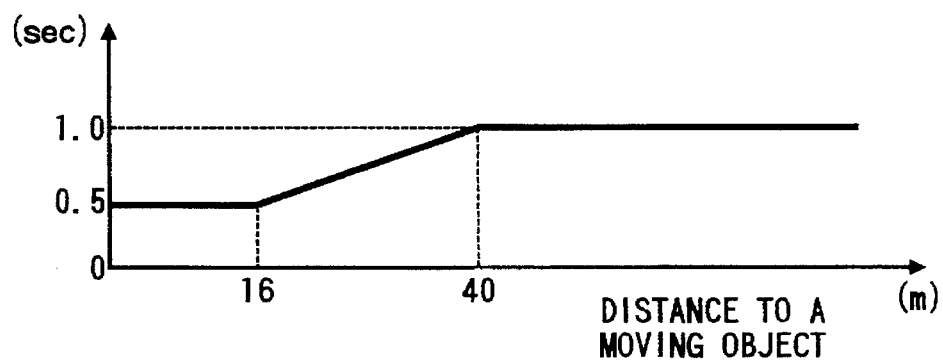
FIG. 16 is a graph which shows the relation between a distance to a moving object and an inoperative time during which an alarm operation is inhibited.

The preselected period of time provided in step 490 may be determined, as shown in FIG. 16, according to a distance to the moving object. FIG. 16 shows that a constant shorter time of 0.5 sec. is provided in a range of 0 to 16 (m), a linearly increasing time is provided in a range of 16 to 40 (m), and a constant longer time of 1.0 sec. is provided in a range over 40 (m). In other words, according to decrease in the distance to the moving object, the preselected period of time is so set as to be decreased for releasing a non-alarm condition earlier to assure a high degree of safety. This is due to the fact that the degree of danger of collision with the moving object becomes high when the distance to the moving object is short and the moving object is not another vehicle nipping merely in front of the system vehicle.

After step 494, the routine, as mentioned above, proceeds to step 450 wherein it is determined whether the condition determined in step 494 remains unchanged for a given period of time or not. If the condition has changed, then the routine proceeds to step 460 wherein no alarm is issued. Alternatively, if the condition remains unchanged, then the routine proceeds to step 470 wherein it is concluded that the alarm condition is met.

After step 470, the routine proceeds to step 280 shown in FIG. 4 wherein the alarm sound generator 13 is activated to issue an alarm to the vehicle operator.

Referring back to FIG. 3, a stationary object warning routine performed in step 300 will be described below.

Figure 5:
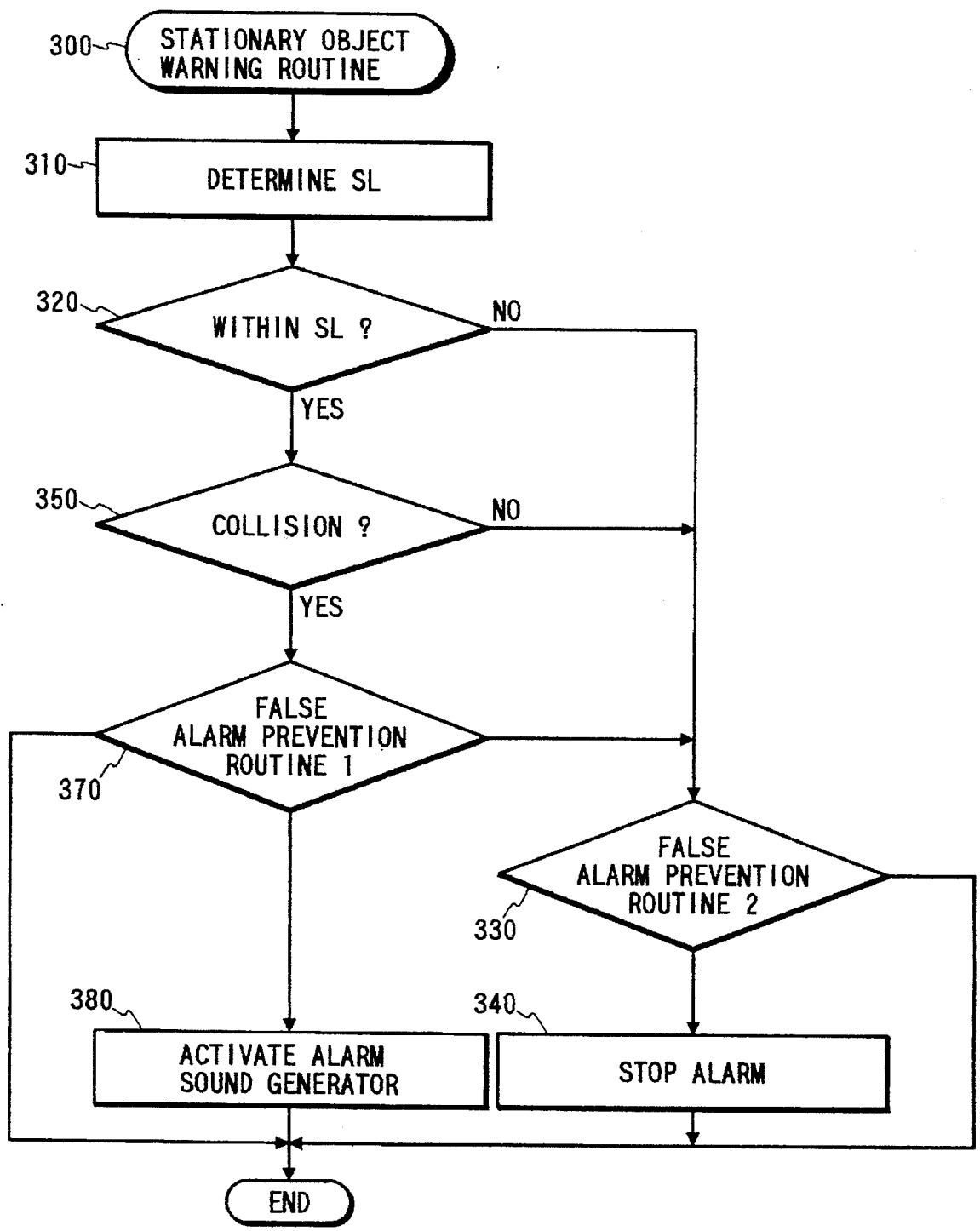
FIG. 5 is a flowchart which shows a stationary object alarm operation of a collision alarm system.

After entering step 300, the routine proceeds to step 310 shown in FIG. 5 wherein a stationary object warning distance SL is determined in a conventional manner known in the art. For example, the stationary object warning distance SL may be determined in proportion to the speed VR of the system vehicle or further taking the braking capability of the system vehicle into account. The routine then proceeds to step 320 wherein it is determined whether a stationary object tracked by the system vehicle comes within the stationary object warning distance SL or not. Note that steps 320, 330, 340, 350, 370, and 380 are substantially the same as steps 220, 230, 240, 250, 270, and 280 shown in FIG. 4, and explanation thereof in detail will be omitted here.

As will be appreciated from the flowchart in FIG. 5, there is no auxiliary collision determination routine (corresponding to step 260 in FIG. 4) because of nature of a stationary object. If it is concluded in step 350 that there Is no possibility of collision with a stationary object, then the routine proceeds directly to 330 wherein the false alarm prevention routine 2 is carried out. Additionally, of the false alarm prevention routine 1 in step 370, steps 444 and 446 shown in FIGS. 6, 7, and 8 are not performed, and the routine proceeds directly to step 450.

Accordingly, if the alarm condition is met in step 370, the alarm sound generator 13 is activated in step 380 to issue an alarm for informing the vehicle operator of close proximity to a stationary object present ahead of the system vehicle.

Figure 15:
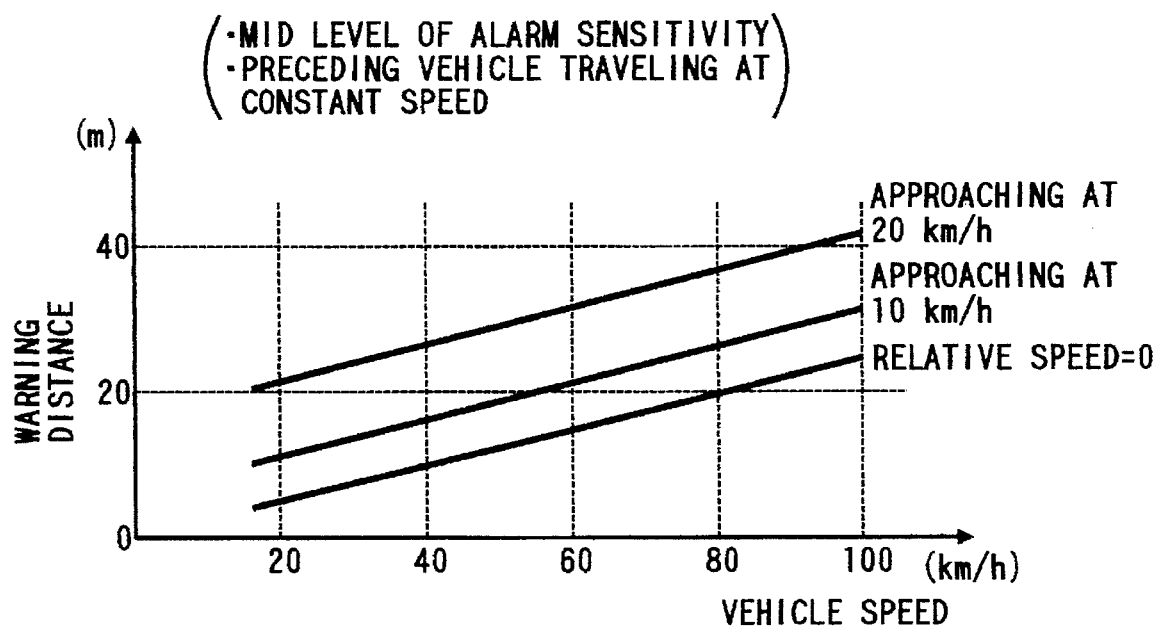
FIG. 15 is a graph which shows the relation between a vehicle speed and a moving object warning distance.

FIG. 15 shows how the moving object warning distance ML is determined based on a relative speed of a preceding vehicle. When the relative speed of the preceding vehicle is low, that is, an approaching speed is high (for example, 20 km/h, namely, VRR=−20 km/h), a possibility of collision becomes high and thus the moving object warning distance ML is set longer. When the relative speed of the preceding vehicle is high, that is, the approaching speed is low (for example, 10 or 0 km/h, namely, VRR=−10 or 0 km/h), the possibility of collision becomes low and thus the moving object warning distance ML is set shorter. Additionally, as the vehicle speed VR of the system vehicle is decreased, the possibility of collision becomes low and thus the moving object waning distance ML is set shorter.

As described above, the moving object warning distance ML used in determining whether an alarm should be issued or not is set according to data matching with the human sensitivity, so that the alarm is allowed to be issued only when an obstacle present ahead of the system vehicle falls within a distance not causing discomfort to a vehicle operator.

Figure 17A:
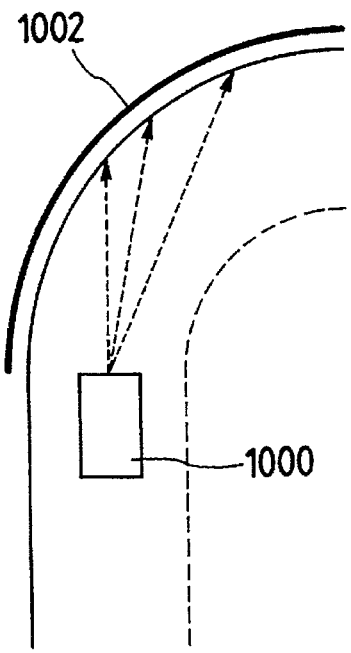
FIG. 17(a) is an illustration which shows a system vehicle entering a curved road and tracking a guardrail.
Figure 18:
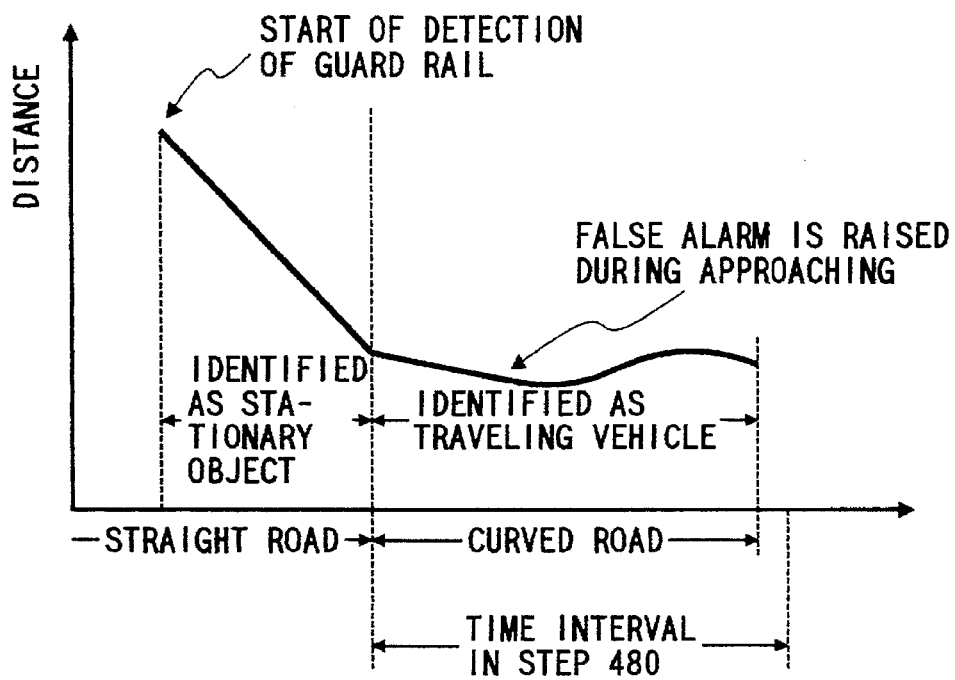
FIG. 18 is a time chart which shows a change in distance to a guardrail during turning of a system vehicle along a curved road.

Additionally, when the vehicle 1000 enters, as shown FIG. 17(a), a curve from a straight road, the guardrail 1002 which has been tracked as a stationary object is, as indicated by broken arrows, identified by the distance measuring scanner 5 as an object moving ahead at the same distance away from the vehicle 1000 because of turning of the vehicle 1000 along the curve. This causes a tracked target to be considered, as can be seen in FIG. 18, to have been changed from a stationary object to a moving object (i.e., a preceding vehicle). Therefore, even when the vehicle 1000 has slightly approached the guardrail 1002, a conventional collision alarm system mistakenly recognizes the guardrail 1002 as a preceding vehicle approaching the vehicle 1000 issues a false alarm, even though the vehicle 1000 is traveling safely. In contrast, the collision alarm system 1 of the invention identifies the guardrail 1002 as a stationary object for the preselected period of time in step 480 shown in FIG. 7 without issuing an alarm. Since the preselected period of time in step 480 is set to a time interval sufficient for the system vehicle to pass through the curve, the collision alarm system 1 does not raise a false alarm. After the preselected period of time, the control is changed to step 484. Thus, when a tracked target is a preceding vehicle decelerating to approach the system vehicle, the collision alarm system 1 correctly identifies the tracked target as the preceding vehicle so that an alarm is raised when the preceding vehicle comes within the moving object warning distance ML.

Figure 17B:
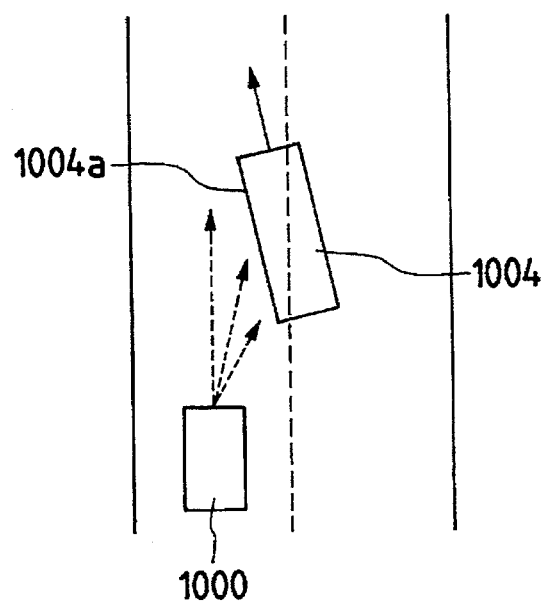
FIG. 17(b) is an illustration which shows a vehicle traveling on an adjacent lane squeezing ahead of a system vehicle.
Figure 19:
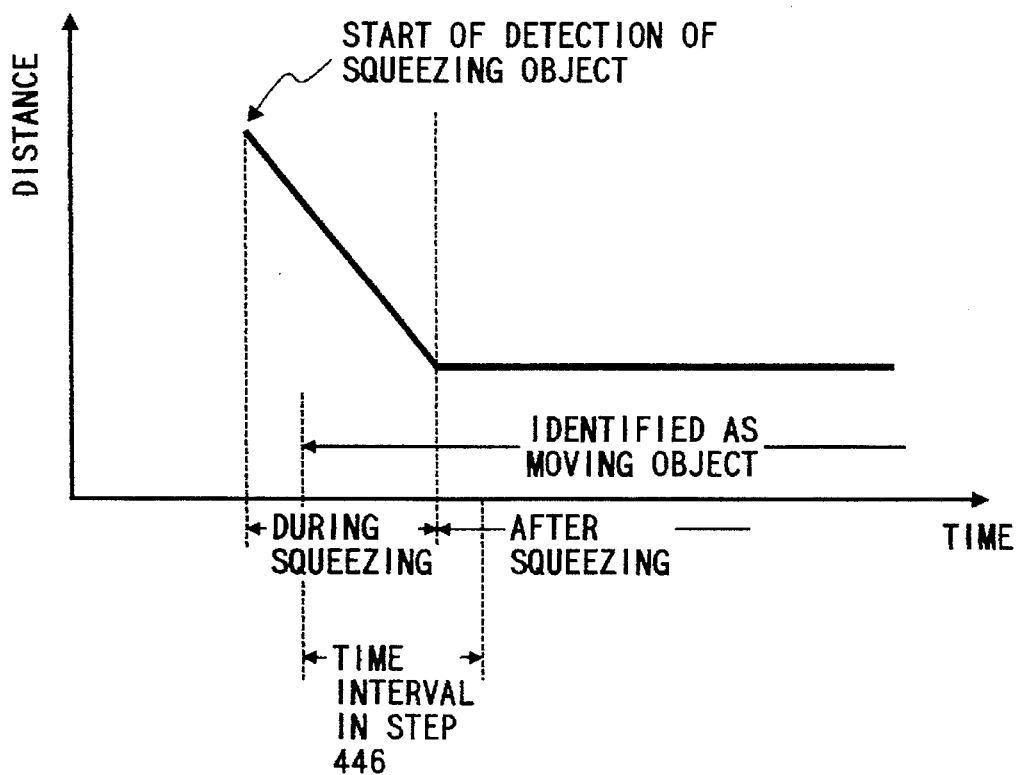
FIG. 19 is a time chart which shows a change in distance to a large vehicle when it squeezes ahead of a system vehicle.

Further, when a vehicle 1004 traveling on an adjacent traffic lane, as shown in FIG. 17(b), has squeezed or appeared suddenly in front of the vehicle 1000, the distance measuring scanner 5, as shown in FIG. 19, detects a distance to the vehicle 1004. Specifically, since the determination of whether a tracked target is a stationary object or a moving object requires time for measurement of distance to the tracked target and processing thereof, the vehicle 1004 is initially identified as an unidentified object, after which it is identified as a moving object. When the vehicle 1004 is a large vehicle, the distance measuring scanner 5 monitors part of a side surface 1004a appearing slowly in front of the vehicle 1000. In this case, a conventional collision alarm system recognizes the vehicle 1004 as a moving object approaching the vehicle 1000 so that a false alarm is raised. In contrast, when a tracked target has changed from an unidentified object to a moving object, the collision alarm system 1 of the invention considers, in step 446, the tracked target as the squeezing vehicle 1004 for the preselected period of time without issuing an alarm. When the tracked target is a real squeezing vehicle, a traveling direction of the tracked target becomes parallel to that of the vehicle 1000 within the preselected period of time so that the side surface 1004a disappears. Thus, after the preselected period of time, the collision alarm system 1 identifies the tracked target as the vehicle 1004 traveling at the same speed as that of the vehicle 1000 without issuing an alarm. Of course, when the vehicle 1004 decelerates to approach to the vehicle 1000, the collision alarm system 1 concludes that there is a high possibility of collision, and activates the alarm sound generator 13 to issue an alarm.

Figure 12:
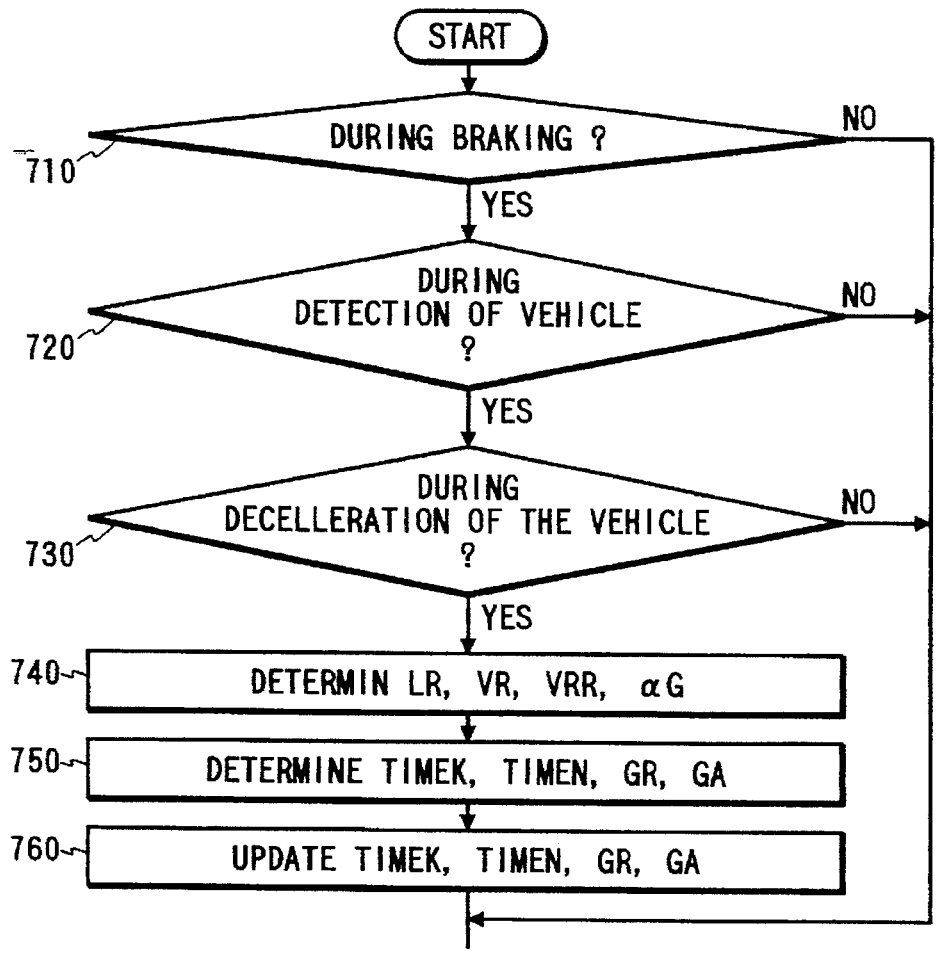
FIG. 12 is a flowchart which shows an operation of an alarm sensitivity selector.

A second embodiment of the collision alarm system 1 will be described below which is designed to automatically adjust the waning distance parameter TIMEK, the reaction time parameter TIMEN, the braking deceleration parameter GR, and the deceleration parameter GA, as set manually in the above first embodiment, and which is different from the first embodiment only in that an automatic adjustment of a set value of the alarm sensitivity selector 25 shown in the flowchart of FIG. 12 is made before step 100 shown in FIG. 3.

First, in step 710, it is determined whether the system vehicle is braking or not. If a YES answer is obtained, then the routine proceeds to step 720 wherein it is determined whether a tracked target is a preceding vehicle or not. If a YES answer is obtained, then the routine proceeds to step 730 wherein it is determined whether the tracked preceding vehicle is decelerating or not. If the system vehicle is braking and the tracked target is decelerating preceding vehicle, then the routine proceeds to step 740. In other cases, the routine proceeds directly to step 100.

In step 740, an actual intervehicle distance LR to the preceding vehicle, the vehicle speed VR, the relative speed VRR, and the preceding vehicle acceleration αG are determined by the distance measuring scanner 5 and the speed sensor 7 and stored in a memory (RAM) in the control unit 3.

In step 750, the equation (1), as discussed above, is inversely calculated using LR, VR, VRR, and αG to derive the parameters TIMEK, TIMEN, GR, and GA shown in FIGS. 13(a), 13(b), 14(a), and 14(b). These parameters are, as appreciated from the explanation of the first embodiment, determined in a given ratio based on one set value of the alarm sensitivity selector 25. Therefore, individual values of TIMEK, TIMEN, GR, and GA can be derived by dividing a value calculated by substituting values of LR, VR, VRR, and αG for the equation (1) with replacement of MR with LR, by the given ratio.

The parameters TIMEK, TIMEN, GR and GA thus determined may be used directly, however, in step 760, they are averaged respectively using parameters determined in a previous program cycle in order to eliminate the influence of noise. If the average cannot be taken because step 760 is in the first program cycle, the parameters TIMEK, TIMEN, GR, and GA determined in step 760 and parameters which have already been set by the alarm sensitivity selector 25, may be averaged, respectively.

While in the above embodiments, the moving object warning distance ML is determined using the equation (1), it may alternatively be determined using the following equation omitting a term ($\alpha G \cdot GA$) from the equation (1) for the sake of simplicity of calculation.

$$ML = VR \cdot TIME_K - VRR \cdot TIME_N + VRR^2/(2 \cdot GR) \qquad (2)$$

Figure 20:
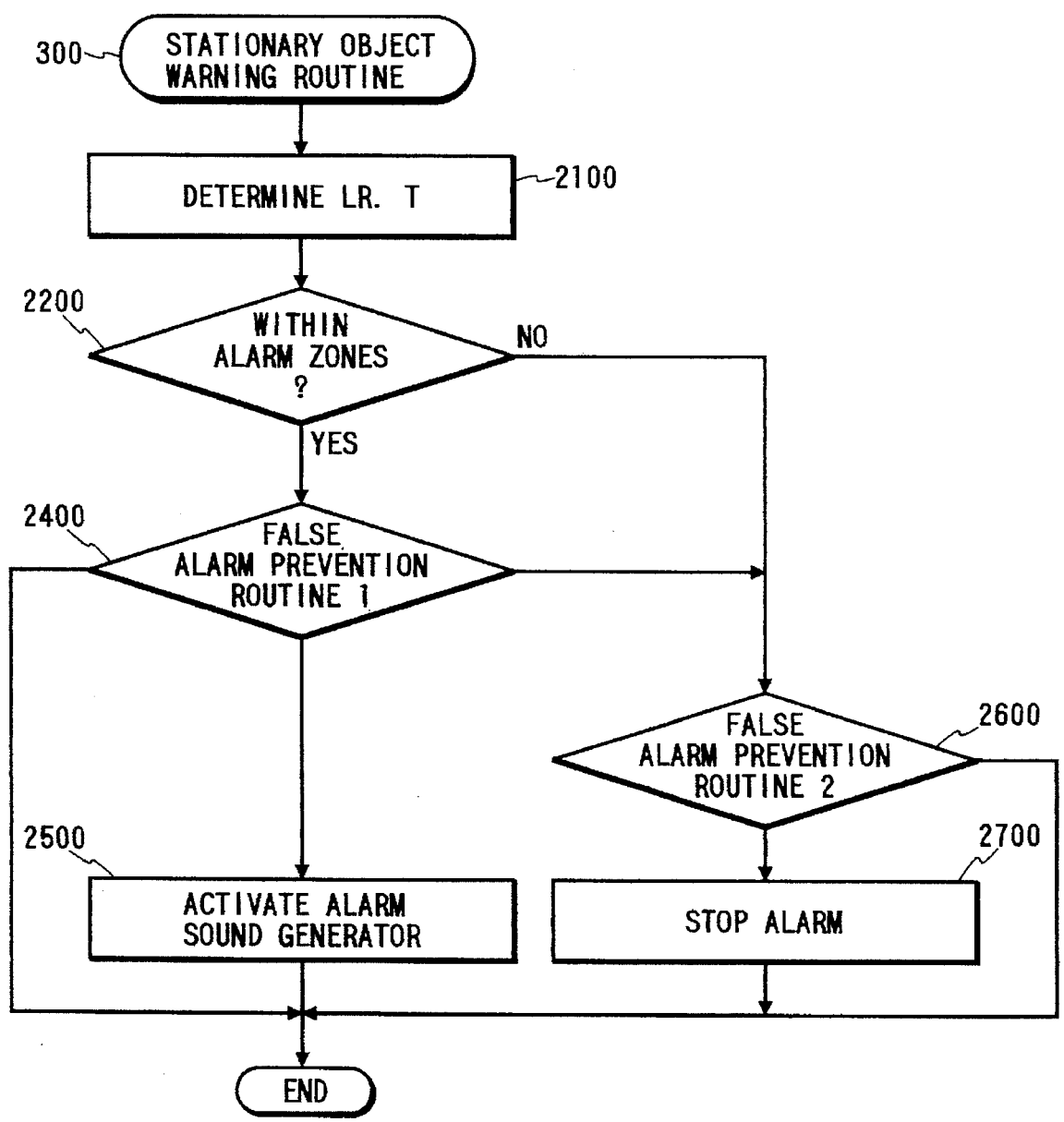
FIG. 20 is a flowchart which shows a stationary object alarm operation of a collision alarm system according to a second embodiment of the invention.

FIG. 20 shows a modification of the stationary object warning routine, as discussed in step 300 of FIG. 3 in the first embodiment.

After a target tracked by the collision alarm system 1 is identified as a stationary object in step 100 of FIG. 3, the routine proceeds to step 2100 wherein an actual distance LR to the stationary object and a detection duration T for which the stationary object is detected by the distance measuring scanner 5 and identified by the object identifying circuit 45 are determined and stored in a memory installed in the alarm/cruise determining circuit 55 for updating them every program cycle.

Figure 21A:
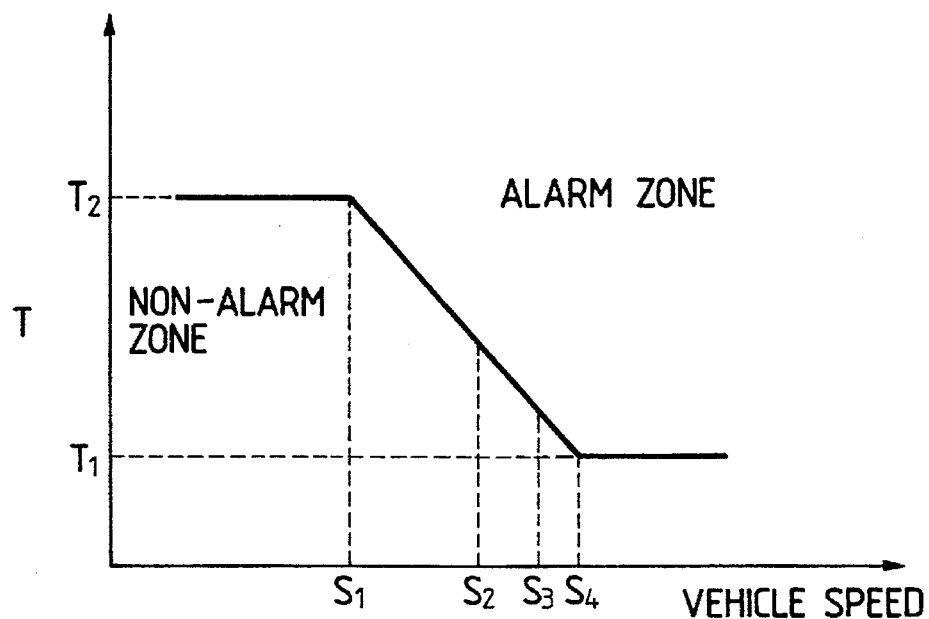
FIG. 21(a) is a graph which shows the relation between a vehicle speed and a detection duration for which a stationary object is detected.
Figure 21B:
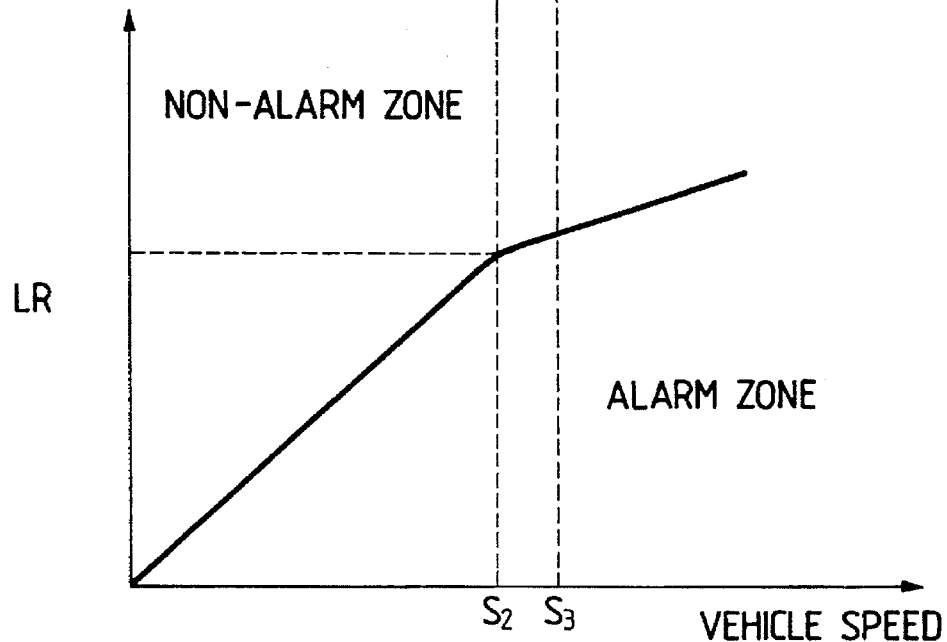
FIG. 21(b) is a graph which shows the relation between a vehicle speed and a proximity distance to a stationary object for defining a non-alarm zone and an alarm zone.
Figure 22:
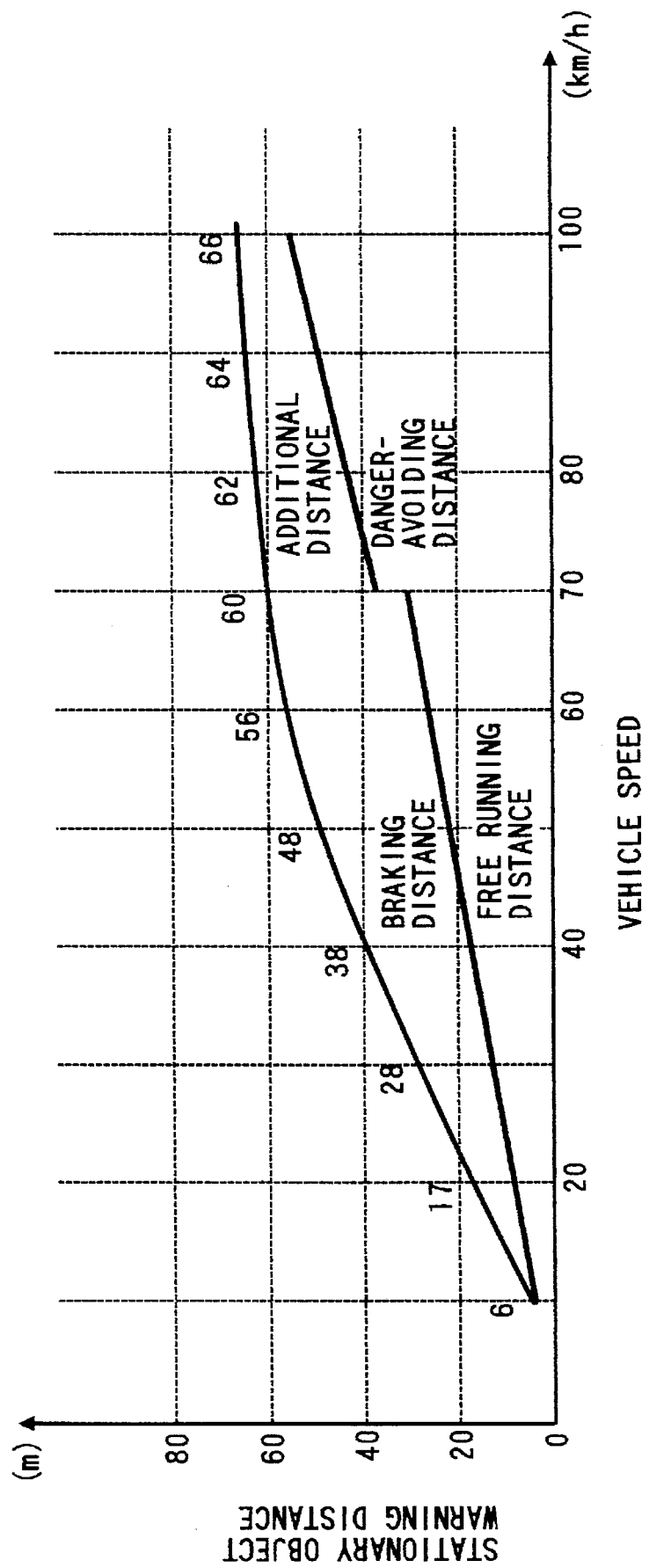
FIG. 22 is a graph which shows the relation between a vehicle speed and a stationary object warning proximity distance.

The routine then proceeds to step 2200 wherein it is determined if the actual distance LR and the detection duration T fall respectively within alarm zones defined, as shown in FIGS. 21(a) and 21(b), according to the vehicle speed VR monitored by the speed sensor 7. In FIG. 21(a), a solid line indicates a boundary defining the alarm zone and the non-alarm zone according to the vehicle speed VR. For example, within a range of the vehicle speed VR less than $S_1$ (e.g., 40 km/h), when the detection duration T is longer than a constant time $T_2$, it falls within the alarm zone, meaning that there is a stationary object in front of the system vehicle. When the detection duration T is shorter than a constant time $T_1$ within a range of the vehicle speed VR greater than $S_4$ (e.g., 80 km/h), it falls within the non-alarm zone. Similarly, in FIG. 21(b), a solid line indicates a boundary defining the alarm zone and the non-alarm zone according to the vehicle speed VR. The boundary varies at a greater inclination $\theta 1$ within a range of the vehicle speed VR less than $S_2$ (e.g., within a range from 40 to 70 km/h), while it varies at a smaller inclination $\theta 2$ within a range of the vehicle speed VR greater than $S_2$. The greater inclination $\theta 1$ is set to the sum of a free running distance and a braking distance. The smaller inclination $\theta 2$ may be set to one-fifth (⅕) of $\theta 1$ or alternatively be zero ($\theta 2=0$). Additionally, the boundary within the higher speed range may be set based on the sum of a collision-avoiding distance prodded by a steering operation of the vehicle operator and a given additional distance so that it may smoothly continue the boundary within the lower speed range. FIG. 22 shows an example where the greater inclination $\theta 1$ is set to the sum of a free running distance and a braking distance and the smaller inclination $\theta 2$ is set based on the collision-avoiding distance and the additional distance. An upper area defined above the boundary indicates a non-alarm zone in which the distance LR to the tracked stationary object falls within a safe distance allowing the vehicle operator to avoid collision with the stationary object through braking and steering operations. A lower area defined below the boundary indicates an alarm zone in which the distance LR falls out of the safe distance and which shows that there is a high possibility of collision with the tracked stationary object.

If, in step 2200, it is concluded that the actual distance LR and the detection duration T both fall within the alarm zones meaning that there is a high possibility of collision with the stationary object tracked, then the routine proceeds to step 2400 wherein a false alarm prevention routine 1 is executed. Alternatively, if there is a lower possibility of collision with the stationary object tracked in step 2200, then the routine proceeds to step 2600 wherein a false alarm prevention routine 2 is executed.

Figure 23:
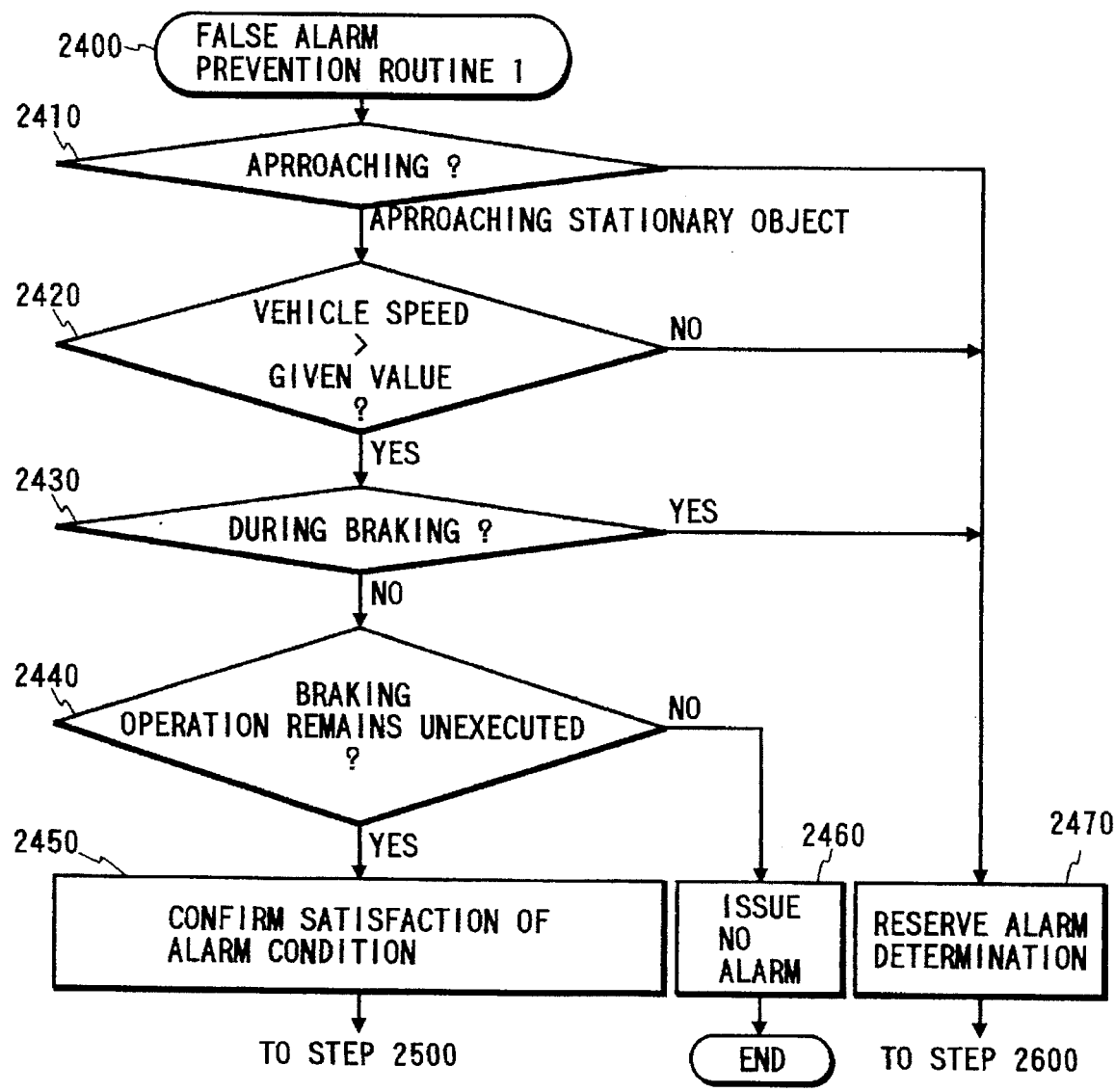
FIG. 23 is a flowchart which shows a false alarm prevention routine 1 executed by a collision alarm system according to a second embodiment of the invention.

The false alarm prevention routine 1 is shown by the flowchart in FIG. 23. In step 2410, it is determined whether the stationary object tracked is approaching the system vehicle or not. If a YES answer is obtained, then the routine proceeds to step 2420 wherein it is determined whether the vehicle speed VR of the system vehicle is greater than a given warning threshold speed or not. The warning threshold speed may be set to 20 km/h, for example. Usually, a vehicle makes a turn frequently in a parking lot, causing an alarm to be raised undesirably against even a collision with another vehicle, a wall, or a column. In order to avoid such a false alarm, the warning threshold speed of 20 km/h is provided in step 2420 for preventing a determination of whether an alarm should be issued or not from being made in a range less than 20 km/h. It is advisable that once the vehicle speed reaches 20 km/h, an alarm be allowed to be issued until the vehicle speed is decreased below 15 km/h.

If a YES answer is obtained in step 2420 meaning that the vehicle speed VR exceeds the given warning threshold speed, then the routine proceeds to step 2430 wherein it is determined whether the system vehicle is now braking or not. If a NO answer is obtained, then the routine proceeds to step 2440 wherein it is determined whether the braking operation remains unexecuted for a given period of time or not. If a YES answer is obtained, then the routine proceeds to step 2450 wherein it is concluded that a given alarm condition is satisfied. Alternatively, if a NO answer is obtained, then the routine proceeds to step 2460 wherein the issuance of an alarm is inhibited. If a NO answer is obtained in either of steps 2410 and 2430 or a YES answer is obtained in step 2430, then the routine proceeds to step 2470 wherein a determination of whether an alarm should be issued or not is reserved until a subsequent program cycle.

If, in step 2430, it is concluded that the system vehicle is in the braking operation, the vehicle operator may be considered as driving the system vehicle with sufficient attention to forward traffic so that issuance of an alarm is, as mentioned above, prohibited. The given period of time used in step 2440 is set to a shorter time, for example, 0.3 sec. for avoiding a false alarm caused by the influence of noise. This is due to the fact that when dangerous conditions are encountered, they usually continue for at least 0.3 sec.

Figure 24:
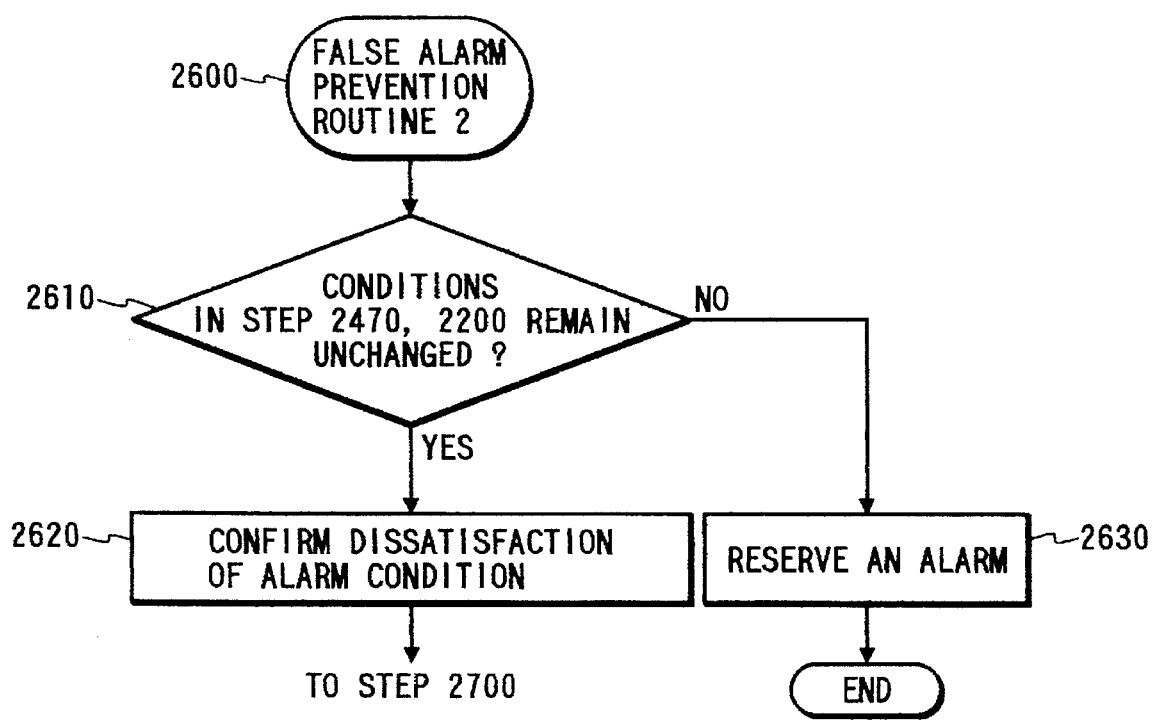
FIG. 24 is a flowchart which shows a false alarm prevention routine 2 executed by a collision alarm system according to a second embodiment of the invention.

FIG. 24 shows a false alarm prevention routine 2 which is effected after step 2470 in FIG. 23 or if, in step 2200 shown In FIG. 20, it is concluded that there is almost no possibility of collision.

In step 2610, it is determined whether the conditions derived in steps 2470 and 2200 remain unchanged for a preselected period of time or not. If a YES answer Is obtained, then the routine proceeds to step 2620 wherein it is concluded that the given alarm condition is not satisfied. Alternatively, if a NO answer is obtained in step 2610, then the routine proceeds to step 2630 wherein an alarm is reserved. According to this routine, only when conditions where an alarm should not be raised are met for the preselected period of time, an alarm is prohibited from being raised.

Figure 25A:
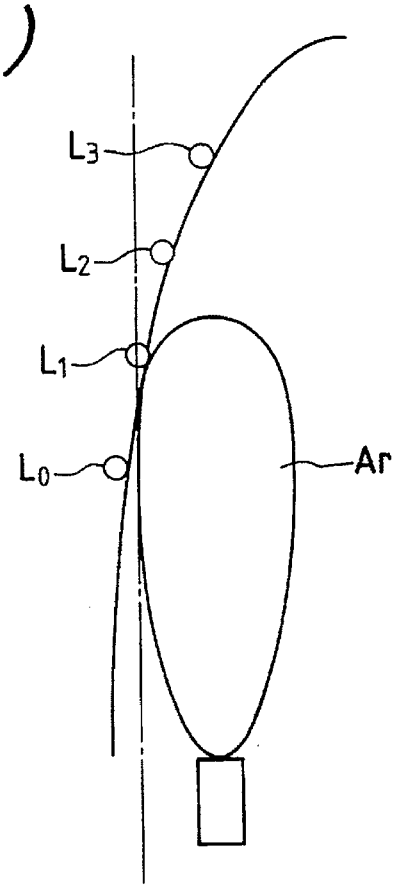
FIG. 25(a) is an illustration which shows detection of an edge of a curved road.

In operation, when the system vehicle 1000, as shown in FIG. 25(a), is traveling on a curved road of an expressway, the distance measuring scanner 5 tracks objects $L_0$, $L_1$, $L_2$, and $L_3$, arranged on a side edge of the curved road, sequentially falling within a detection range Ar as the system vehicle 1000 passes through the curved road. Since an approaching speed of the objects $L_0$, $L_1$, $L_2$, and $L_3$ to the system vehicle 1000 is equal to a vehicle speed, the object identifying circuit 45 of the control unit 3 identifies the objects $L_0$, $L_1$, $L_2$, and $L_3$ as stationary objects, respectively. Therefore, in step 100 shown in FIG. 3, it is concluded that a tracked obstacle is a stationary object present ahead of the system vehicle, and the routine proceeds to step 300 wherein the stationary object warning routine, as discussed above, is executed.

Figure 25B:
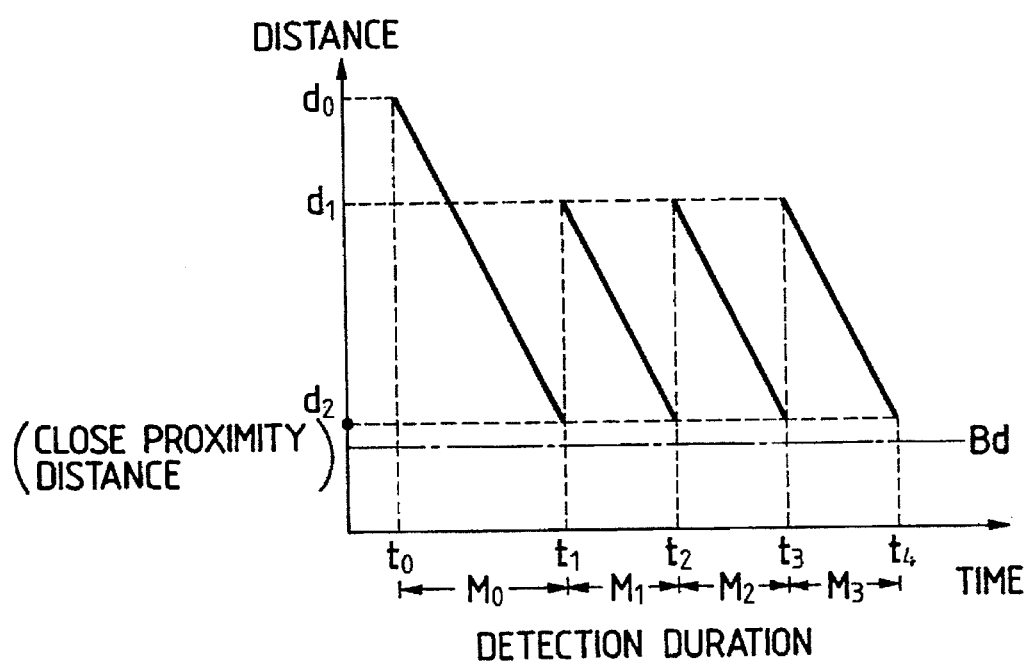
FIG. 25(b) is a time chart which shows the relation between a detection duration and a close proximity distance to the edge of the curved road shown in FIG. 25(a)

First, it is determined whether the distance LR to the stationary object tracked and the detection duration T for which the stationary object is tracked by the distance measuring scanner 5, are determined. For example, assuming that the stationary object $L_0$, as shown in FIG. 25(b), present at a distance d0 away from the system vehicle 1000 is tracked by the distance measuring scanner 5 at a time t0, and it remains tracked until a time t1, the detection duration T is increased from zero to M0 (=t1−t0) gradually, while the distance LR to the stationary object $L_0$ is decreased from d0 to d2 meaning that the system vehicle is approaching the stationary object $L_0$ tracked. During a time frame from t0 to t1, step 300 is repeated several times to determine whether the then vehicle speed VR and the detection duration T fall within the alarm zone or the non-alarm zone shown in FIG. 21(a) or not and determine whether the then vehicle speed VR and the distance LR to the stationary object $L_0$ fall within the alarm zone or the non-alarm zone shown in FIG. 21(b) or not. During the execution of step 300, the detection duration T is increased, while the distance LR to the stationary object $L_0$ is decreased. Thus, the stationary object $L_0$ is initially identified as a safe obstacle unnecessary to give an alarm to the vehicle operator and then approaches the system vehicle 1000 gradually. However, as long as the detection duration T lies out of the alarm zone shown in FIG. 21(a) or alternatively, the distance LR to the stationary object $L_0$ lies out of the alarm zone shown in FIG. 21(b), it is determined every execution of step 300 that there is no possibility of collision with the stationary object $L_0$, and the false alarm prevention routine 2 in step 2600 is performed. If it is determined that the system vehicle 1000 is away from the stationary object $L_0$ in safety for the preselected period of time, the alarm sound generator 13 is deactivated in step 2700 so that an alarm is prohibited from being raised.

The same is true for the stationary objects $L_1$, $L_2$, and $L_3$ having the same appearance distance d1 and the same maximum proximity distance d2. As long as the ultimate detection durations M1, M2, and M3 and the ultimate proximity distance (d1−d2) are out of the alarm zones shown in FIGS. 21(a) and 21(b), respectively, an alarm is prohibited from being issued. Note that, for example, an object, which is easy to track from a distant location, such as the first-tracked object $L_0$ will remain tracked for a relatively long period of time so that the detection duration T is increased. In FIG. 25(b), the object $L_0$ is first tracked at a distance d0 most away from the system vehicle 1000.

The boundary, as shown in FIG. 21 (b), defining the alarm zone and the non-alarm zone has the inclination θ2 decreased in a range over a vehicle speed $S_2$. Specifically, the alarm zone does not expand in a long range direction of proximity distance (i.e., the distance LR) if the vehicle speed is increased. While the detection range Ar of the distance measuring scanner 5 expands at a long range for easy detection of an object, the possibility of issuing false alarm becomes undesirably high. This problem is, however, overcome by decreasing the inclination θ2 of the boundary, as shown in FIG. 21(b), to increase the non-alarm zone In the range over S2. This is because when the distance LR to an object ahead of the system vehicle 1000 is relatively long, a collision with the object may be avoided only by a steering operation even in a range over a relative speed (e.g., 80 km/h).

Figure 26:
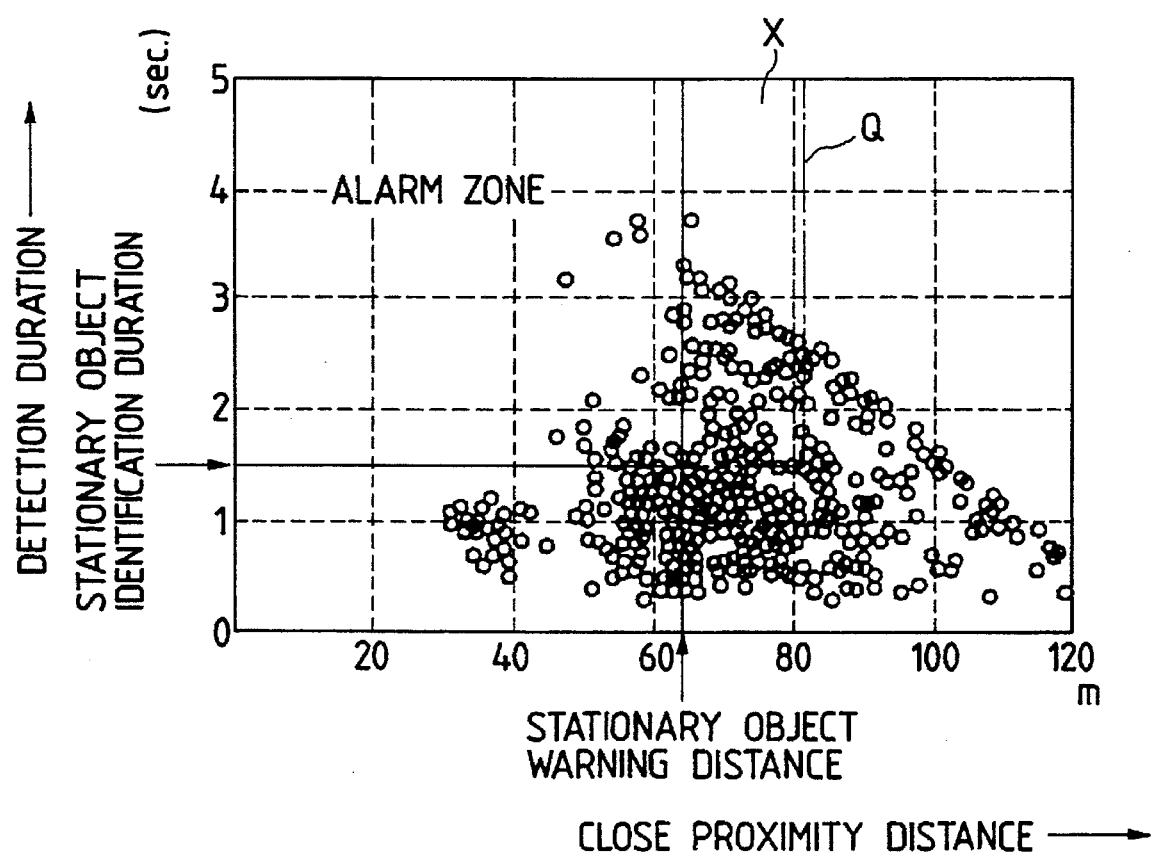
FIG. 26 is a graph which shows experimental results in terms of a detection duration and a stationary object warning distance.

FIG. 26 shows a distribution of maximum proximity distances to a side edge of a road tracked by the system vehicle and detection durations for which the side edge is tracked when the system vehicle travels at about 80 km/h. It is found that 4% of the tracked side edge of the road falls within the alarm zone defined by a proximity distance of less than 62 m and a detection duration of more than 1.5 sec. and the remaining of the tracked side edge falls within the non-alarm zone. In a conventional system, a stationary object warning threshold distance is set greater than 80 m and a range shown by a broken line Q is defined as the alarm zone. Thus, a false alarm is given to about 20% of the side edge of the road.

While the present invention has been disclosed in terms of the preferred embodiment in order to facilitate a better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A collision alarm system for an automotive vehicle comprising:

object determining means for determining whether an object falling within a given detection zone is a stationary object or a moving object and for providing a signal indicative thereof the signal having a first state indicative of a determined stationary object, and a second different state indicative of a determined moving object;

stationary object alarm means, responsive to the signal from said object determining means, for issuing an alarm when a distance between the object determined by said object determining means as the stationary object and said system vehicle equipped with this system falls within a given stationary object warning distance;

moving object alarm means, responsive to the signal from said object determining means, for issuing an alarm when a distance between the object determined by said object determining means as the moving object and the system vehicle falls within a given moving object warning distance; and alarm inhibiting means operatively connected to said moving object alarm means for inhibiting said moving object alarm means from issuing the alarm for a delay period of time after the object falling within the given detection zone which has been determined by said object determining means as the stationary object, is determined as the moving object.

2. A collision alarm system as set forth in claim 1, wherein the given stationary object warning distance is determined based on a preselected traveling condition of the system vehicle.

3. A collision alarm system as set forth in claim 2, wherein the given stationary object warning distance is increased at a first rate in proportion to a speed of the system vehicle within a predetermined lower speed range and at a second rate smaller than the first rate in proportion to the speed of the system vehicle within a predetermined higher speed range.

4. A collision alarm system as set forth in claim 3, wherein a boundary between the predetermined lower speed range and the predetermined higher speed range is set to a given speed within a range from 40 to 70 km/h.

5. A collision alarm system as set forth in claim 3, wherein the second rate at which the given stationary object warning distance is increased is one-fifth (⅕) of the first rate.

6. A collision alarm system as set forth in claim 3, wherein the second rate at which the given stationary object warning distance is increased is set to zero.

7. A collision alarm system as set forth in claim 3, wherein the given stationary object warning distance within the predetermined lower speed range is set to a sum of a free running distance and a braking distance.

8. A collision alarm system as set forth in claim 3, wherein the given stationary object warning distance within the predetermined higher speed range is set to the sum of a collision-avoiding distance provided by a steering operation and a given additional distance.

9. A collision alarm system as set forth in claim 3, wherein the delay period of time during which said moving object alarm means is inhibited from issuing the alarm is shortened according to an increase in speed of the system vehicle, while it is prolonged according to a decrease in speed of the system vehicle.

10. A collision alarm system as set forth in claim 1, wherein the given moving object warning distance is determined based on moving conditions of the system vehicle and the object.

11. A collision alarm system for an automotive vehicle comprising:
    object identifying means for monitoring a moving condition of an object present ahead of a system vehicle equipped with this system, said object identifying means identifying the object as a moving object or an unidentified object other than the moving object and providing a signal indicative thereof the signal having a first state indicative of a determined stationary object, and a second different state indicative of a determined moving object;
    moving object alarm means, responsive to the signal from said object identifying means, for issuing an alarm when a distance between the object identified by said object identifying means as the moving object and the system vehicle falls within a given warning distance; and
    alarm inhibiting means operatively connected to said moving object alarm means for inhibiting said moving object alarm means from issuing the alarm for a delay period of time after the object which has been identified by said object identifying means as the unidentified object, is identified as the moving object.

12. A collision alarm system as set forth in claim 11, wherein the preselected period of time during which said moving object alarm means is inhibited from issuing the alarm is prolonged as the distance between the object identified by said object identifying means and the system vehicle is increased.

13. A collision alarm system as set forth in claim 11, wherein said object identifying means monitors the moving condition of the object present ahead of the system vehicle to determine whether the monitored object is the moving object or the unidentified object, and wherein said alarm inhibiting means inhibits said moving object alarm means from issuing the alarm for the preselected period of time after the object which has been identified as the unidentified object is identified as the moving object.

14. A collision alarm system as set forth in claim 11, wherein the given warning distance is determined based on moving conditions of the system vehicle and the monitored object.

15. A collision alarm system for an automotive vehicle comprising:
    object determining means for determining whether an object falling within a given detection zone is a stationary object or a moving object and for providing a signal indicative thereof the signal having a first state indicative of a determined stationary object, and a second different state indicative of a determined moving object;
    stationary object alarm means, responsive to the signal from said object determining means, for issuing an alarm when a distance between the object determined by said object determining means as the stationary object and said system vehicle equipped with this system falls within a given stationary object warning distance, said given stationary object warning distance being determined based on a preselected traveling condition of the system vehicle;
    moving object alarm means, responsive to the signal from said object determining means, for issuing an alarm when a distance between the object determined by said object determining means as the moving object and the system vehicle falls within a given moving object warning distance, said given stationary object warning distance being increased at a first rate in proportion to a speed of the system vehicle within a predetermined lower speed range and at a second rate smaller than the first rate in proportion to the speed of the system vehicle within a predetermined higher speed range; and
    alarm inhibiting means operatively connected to said moving object alarm means for inhibiting said moving object alarm means from issuing the alarm for a delay period of time after the object falling within the given detection zone which has been determined by said object determining means as the stationary object, is determined as the moving object.

16. A collision alarm system as set forth in claim 15, wherein a boundary between the predetermined lower speed range and the predetermined higher speed range is set to a given speed within a range from 40 to 70 km/h.

17. A collision alarm system as set forth in claim 15, wherein the second rate at which the given stationary object warning distance is increased is one-fifth (⅕) of the first rate.

18. A collision alarm system as set forth in claim 15, wherein the second rate at which the given stationary object warning distance is increased is set to zero.

19. A collision alarm system as set forth in claim 15, wherein the given stationary object warning distance within the predetermined lower speed range is set to a sum of a free running distance and a braking distance.

20. A collision alarm system as set forth in claim 15, wherein the given stationary object warning distance within the predetermined higher speed range is set to the sum of a collision-avoiding distance provided by a steering operation and a given additional distance.

21. A collision alarm system as set forth in claim 15, wherein the delay period of time during which said moving object alarm means is inhibited from issuing the alarm is shortened according to an increase in speed of the system vehicle, while it is prolonged according to a decrease in speed of the system vehicle.

22. A collision alarm system as set forth in claim 15, wherein the given moving object warning distance is determined based on moving conditions of the system vehicle and the object.

23. A collision alarm system for an automotive vehicle comprising:

object identifying means for monitoring a moving condition of an object present ahead of a system vehicle equipped with this system, said object identifying means identifying the object as a moving object or an unidentified object other than the moving object and providing a signal indicative thereof the signal having a first state indicative of a determined stationary object, and a second different state indicative of a determined moving object;

moving object alarm means, responsive to the signal from said object identifying means, for issuing an alarm when a distance between the object identified by said object identifying means as the moving object and the system vehicle falls within a given warning distance; and alarm inhibiting means operatively connected to said moving object alarm means for inhibiting said moving object alarm means from issuing the alarm for a delay period of time after the object which has been identified by said object identifying means as the unidentified object, is identified as the moving object, said delay period of time being prolonged as the distance between the object identified by said object identifying means and the system vehicle is increased.

24. A collision alarm system as set forth in claim 23, wherein said object identifying means monitors the moving condition of the object present ahead of the system vehicle to determine whether the monitored object is the moving object or the unidentified object, and wherein said alarm inhibiting means inhibits said moving object alarm means from issuing the alarm for the preselected period of time after the object which has been identified as the unidentified object is identified as the moving object.

25. A collision alarm system as set forth in claim 23, wherein the given warning distance is determined based on moving conditions of the system vehicle and the monitored object.

* * * * *